United States Patent [19]
Meyering et al.

[11] Patent Number: 6,056,529
[45] Date of Patent: May 2, 2000

[54] SYSTEMS FOR PRODUCING A PLURALITY OF DIFFERENT MICROPOROUS PHASE INVERSION MEMBRANE EACH HAVING ANY ONE OF A PLURALITY OF DIFFERENT PORE SIZES FROM A SINGLE MASTER DOPE BATCH

[75] Inventors: Mark T Meyering, Middlefield, Conn.; William R. Kelly, Moravia, N.Y.; Joseph G. Wallace, Middletown, Conn.

[73] Assignee: Cuno, Inc.

[21] Appl. No.: 09/022,295

[22] Filed: Feb. 11, 1998

[51] Int. Cl.⁷ .............................. B01D 13/00; B01D 71/56
[52] U.S. Cl. ........................ 425/143; 425/144; 425/378.1; 264/41; 264/184
[58] Field of Search ..................... 264/41, 184; 425/4 R, 425/143, 144, 378.1

[56] References Cited

U.S. PATENT DOCUMENTS

| | | | |
|---|---|---|---|
| 3,876,738 | 4/1975 | Marinaccio et al. | 264/41 |
| 4,340,480 | 7/1982 | Pall et al. | 210/490 |
| 4,621,678 | 11/1986 | Hahn et al. | 425/378 |
| 4,645,602 | 2/1987 | Barnes, Jr. et al. | 210/490 |
| 4,707,266 | 11/1987 | Degen et al. | 210/638 |
| 4,770,777 | 9/1988 | Steadly et al. | 264/41 |
| 4,900,449 | 2/1990 | Kraus et al. | 210/651 |
| 5,215,662 | 6/1993 | Johnson et al. | 210/500.38 |
| 5,444,097 | 8/1995 | Tkacik | 210/500.21 |
| 5,458,782 | 10/1995 | Hou et al. | 210/500.38 |
| 5,489,406 | 2/1996 | Beck et al. | 264/41 |
| 5,736,051 | 4/1998 | Degen et al. | 210/638 |
| 5,888,434 | 3/1999 | Mahoney et al. | 264/41 |

FOREIGN PATENT DOCUMENTS

| | | |
|---|---|---|
| 9200137 | 1/1992 | WIPO . |
| 9322034 | 11/1993 | WIPO . |

OTHER PUBLICATIONS

May 10, 1999, PCT International Search Report.
A New Microfiltration Membrane, James S. Johnson, Ph.D.

*Primary Examiner*—Harold Pyon
*Assistant Examiner*—Thukhanh Nguyen
*Attorney, Agent, or Firm*—Cummings & Lockwood

[57] ABSTRACT

Systems for processing dope for the manufacture of microporous phase inversion membrane having any one of a plurality of different pore sizes from a single master dope batch is disclosed. The systems and methods include formulating a single master batch of dope preferably maximizing the non-solvent to solvent ratio for a given weight percentage of polymer for use in a microporous phase inversion membrane casting operation to produce phase inversion membranes having one of a plurality of different predetermined pore sizes. The master dope batch is controllably formulated in a vessel such that the temperature of the dope does not exceed a predetermined maximum mixing temperature and is maintained at a relatively low temperature (lower than the mixing temperature) suitable for storage. A small portion of the dope is then sequentially heated to a temperature no higher than any one of a plurality of target temperatures, the target temperature corresponding to a specific desired pore size to be formed in the microporous phase inversion membrane that results from casting the dope. As portions of the dope are incrementally transferred from the vessel to the dope casting apparatus, the dope portions are heated to a temperature no higher than within about ±0.15° C. of the target temperature. The dope is then cooled to about room temperature or the temperature which results in a suitable and/or optimal casting viscosity and transferred to the dope casting apparatus to be forming microporous phase inversion membrane having any one of a plurality of different possible pore sizes.

44 Claims, 8 Drawing Sheets

Fig. 3 (RUN 1)

SYSTEMS FOR PRODUCING A PLURALITY OF DIFFERENT MICROPOROUS PHASE INVERSION MEMBRANE EACH HAVING ANY ONE OF A PLURALITY OF DIFFERENT PORE SIZES FROM A SINGLE MASTER DOPE BATCH

BACKGROUND OF THE INVENTION

The present invention relates generally to methods and systems for producing a plurality of different pore size microporous phase inversion membrane each having any one of a plurality of different pore sizes from a single master dope batch. More specifically, it relates to methods and systems for selectively essentially instantaneously thermally manipulating at least a portion of a master dope batch to a temperature within about ±0.2 to about ±0.15° C. of a predetermined temperature which has proven to yield microporous phase inversion membrane having about a specific pore size formed therein when processed. Most specifically, it relates to methods and systems for exacting essentially instantaneous thermal manipulation to a finer degree of control over a small portion of dope incrementally processed from a master batch such that a wider range of possible pore sizes can be selectively formed in microporous phase inversion membrane produced therefrom than was previously believed possible from a single master batch of dope and in a short time frame.

Microporous phase inversion membranes are well known in the art. Microporous phase inversion membranes are porous solids which contain microporous interconnecting passages that extend from one surface to the other. These passages provide tortuous tunnels through which the liquid which is being filtered must pass. The particles contained in the liquid passing through a microporous phase inversion membrane become trapped on or in the membrane structure effecting filtration. A slight pressure, generally in the range of about five (5) to about fifty (50) psig (pounds per square inch gauge) is used to force fluid through the microporous phase inversion membrane. The particles in the liquid that are larger than the pores are either prevented from entering the membrane or are trapped within the membrane pores. The liquid and particles smaller than the pores of the membrane pass through. Thus, a microporous phase inversion membrane prevents particles of a certain size or larger from passing through it, while at the same time permitting liquid and particles smaller than that certain size to pass through. Microporous phase inversion membranes have the ability to retain particles in the size range of from about 0.01 to about 10.0 microns.

Many important micron and submicron size particles can be separated using microporous membranes. For example, red blood cells are about eight (8) microns in diameter, platelets are about two (2) microns in diameter and bacteria and yeast are about 0.5 microns or smaller in diameter. It is possible to remove bacteria from water by passing the water through a microporous membrane having a pore size smaller than the bacteria. Similarly, a microporous membrane can remove invisible suspended particles from water used in the manufacture of integrated circuits in the electronics industry. Microporous membranes are characterized by bubble point tests, which involve measuring the pressure to force either the first air bubble out of a fully wetted phase inversion membrane (the initial Bubble Point, or "IBP"), and the higher pressure which forces air out of the majority of pores all over the phase inversion membrane (foam-all-over-point or "FAOP"). The procedures for conducting initial bubble point and FAOP tests are discussed in U.S. Pat. No. 4,645,602 issued Feb. 24, 1987, the disclosure of which is herein incorporated by reference. The procedure for the initial bubble point test and the more common Mean Flow Pore tests are explained in detail, for example, in ASTM F316-70 and ANS/ASTM F316-70 (Reapproved 1976) which are incorporated herein by reference. The bubble point values for microporous phase inversion membranes are generally in the range of about five (5) to about one hundred (100) psig, depending on the pore size and the wetting fluid.

Methods and Systems for preparing the dope used to produce microporous membrane are known in the art. There are numerous methods of preparing the dope. A number of the known prior methods of dope preparation are discussed in representative U.S. Pat. No. 3,876,738 issued Apr. 8, 1975, U.S. Pat. No. 4,340,480 issued Jul. 20, 1982, U.S. Pat. No. 4,770,777 issued Sep. 13, 1988, and U.S. Pat. No. 5,215,662 issued Jun. 1, 1993, the disclosure of each is herein incorporated by reference.

One specific method for the preparation of dope (U.S. Pat No. 3,876,738) to produce a specific pore size when processed into microporous membrane was to batch formulate the dope by polymer to nonsolvent to solvent ratio as a predictive control of pore size. Batch formulation was conducted at an assumed maximum temperature. In practice, to maintain a single precise mixing temperature over a four (4) to six (6) hour period necessary to compete the mixing cycle is very difficult. Precision in formulation and precision in the uniformity of mixing (shear history and temperature history) are equally important to the successful commercialization of phase inversion membrane having specific and controlled pore size formed therein.

During the mixing of the dope ingredients, solvent and nonsolvent were mixed first and then the polymer was added to the mixture of nonsolvent with the temperature being controlled and assumed not to exceed a certain temperature. In this formulation process, the solvent, such as, for example, formic acid, was first placed in a vessel. Next, the nonsolvent, such as, for example, methanol, was added and the nonsolvent and solvent were allowed to react and reach equilibrium. After the solvent and nonsolvent mixture reached equilibrium, the polymer, such as, for example, nylon was added and blended with the solvent and nonsolvent mixture for a sufficient amount of time and under reasonably controlled conditions of temperature and solution agitation (shear) to effect the dissolving of the nylon polymer in the solvent/non-solvent mixture until the polymer/solvent/nonsolvent mixture reached equilibrium.

It is known that processing relatively large bodies of dope, such as that used in the production of microporous phase inversion membranes, is accompanied by many difficulties such as the need to formulate separate dope batches for each size pore phase inversion membrane produced as well as the problems in controlling the temperature of the dope during the batching process.

Dope that has been formulated according to a particular formulation may, due to process variables, produce out of specification phase inversion membrane. In the past, in order to salvage out of specification batches, the out-of-specific batches were reprocessed by bulk heating to a higher temperature which produced a larger pore size when reprocessed. Dope reprocessing included elevating the dope temperature of large amounts of dope such as, for example, up to one hundred (100) gallons and even larger batches to a predetermined target temperature.

Dope reprocessing was needed because, during the batch formulation process, formulation errors were introduced into the batch such as incorrect amounts of ingredients, different nylon batches and other processing errors that occurred in the batch mixing process. Because of the differences in the resulting dope batches due to different lots of nylon, different types of reactants and etc., microporous phase inversion membrane having the same exact pore size was not always produced from different batches prepared according to the same recipe each and every time. In fact, a band of predictable pore sizes for each specific formulation was developed over a period of time.

If the pore size from a particular batch of a particular formulation turned out to be too open or have larger than the maximum pore size permitted by the specification for the end use, then that batch was scrapped, due to production schedules as retaining the dope for a future run at that pore size was impractical and because it was not possible to reprocess the batch to produce phase inversion membrane having a smaller pore size. If the formulation of a specific dope batch resulted in the characterization of the pore size being too tight or small, then that batch of dope was reprocessed by batch bulk reheating.

It should be pointed out that during production runs of microporous phase inversion membrane, it is important to produce microporous phase inversion membrane having the desired pore size and/or pore size distribution.

As described above, in the past, out-of-specification dope for the production of microporous phase inversion membrane was conventionally reprocessed by bulk reheating of the dope in a vessel under pressure having an external water jacket and an internal agitating means to correct missed values. As is known, heat transfer by bulk heating to a large mass of material, such as a dope batch undergoing specification correction/reprocessing, utilizing the thermal transfer jacket and conventional agitation means has proven to be difficult. As is known, this method of reprocessing dope can produce areas within the vessel where fluid flow is reduced or stagnant and, thus, the dope in those areas of the vessel may not be sufficiently intermixed with the entire mass of dope to ensure that the entire mass of dope was elevated to about the same temperature. If some portion of the dope batch being reprocessed was heated above or had already been heated above the target temperature, then that portion of the dope when processed produced pores in the microporous phase inversion membrane that are larger than desired. The continued, prolonged mixing of these portions does not necessarily result in a uniform dope of narrow pore size distribution, but, may in fact, have the opposite effect of increasing (widening) the pore size distribution resulting in an inferior phase inversion membrane.

Specifically, it may be that each portion of the dope in the batch was not heated to the target temperature but may, in fact, have been heated to a temperature either higher or lower than the target temperature. For example, portions of the dope that for one reason or the other remained closer to the internal wall of the external heating jacket of the vessel during reprocessing tended to be heated to a higher temperature than the portions of the dope which do not come in contact with the internal wall of the heating jacket around the large mass of dope contained inside the vessel.

A temperature control problem was identified during the reprocessing of conventionally formulated dope batches undergoing reprocessing in that not all portions of the dope had been heated to the new temperature within a very tight temperature range. Specifically, it is now believed that the portions of the dope proximate the inner wall of the heating jacket of the vessel were heated to a temperature above the new target temperature during reprocessing and, thus, when cast, produced microporous phase inversion membrane having pores larger than desired as well as an unacceptable pore size distribution.

In summary, in this batch formulation process, the dope formulation (solvent, nonsolvent, polymer ratio) was key to controlling pore size in the microporous phase inversion membrane. Using the batch formulation method as a predictive control of pore size in microporous phase inversion membrane, microporous phase inversion membrane having a specific pore size was produced from a specifically formulated dope batch.

Another prior method of making dope (U.S. Pat. No. 4,340,480) to produce micropourous phase inversion membrane comprised mixing a dope to a maximum nonsolvent level concurrently to a point in fact where so much nonsolvent is being added that the system started to kick out and precipitate the polymer. The non-solvent was added to the mixture in a very high sheer region. By using this method, it was claimed that the pore size of the membrane produced could be controlled on a batch basis by controlling the mixer speed. Specifically, the dope is formulated by first mixing formic acid and nylon, then introducing water in a very high sheer region and finally adjusting the speed of the mixer. This method appears to correlate pore size with mixer speed but does not appear to either measure or attempt to control temperature. As is known, there are more precise ways for controlling temperature than trying to control the impeller speed of a mixer.

Another prior, specific method for the preparation of dope using nylon 46 (U.S. Pat. No. 5,215,662) for producing a specific pore size when processed into microporous membrane was to mix a greater proportion of the nylon 46 polymer in a solvent/nonsolvent solution to produce smaller pores in the resulting membrane. In this method, nylon 46 was slowly added into the mixing solvents and nonsolvents at temperatures ranging from about 25° C. to about 80° C. at a speed sufficient to prevent the polymer from clumping, but insufficient to cause overheating and polymer degradation (the only apparent process temperature control parameter mentioned). As described in the patent, within this temperature range, higher temperatures caused dissolution to proceed more rapidly and the mix time to total dissolution can be decreased. In this patent, higher solution temperatures were purported to result in somewhat larger pore sizes and temperature controls were purported to be used to further manipulate the pore sizes of the produced membrane, in connection with variations in the composition of the bath (See Example 4). However, there appears to be no attempt to precisely control the temperature of the solution during formulation.

This patent appears to teach the use of a dispersion system, which included temperature controls, preferably a heat exchanger, to change the pore size and the viscosity of the mixture as necessary to obtain a smooth, even flowing of the mixture for processing into membrane. According to the patent, as the temperature of the mixture rises, and as the higher temperatures are maintained for longer periods of time, membrane pore size was increased. This feature was purported to allow production flexibility because the solutions temperature reportedly could be manipulated to produce a range of pore sizes from a single batch of solution. Further, the composition and process temperature control manipulation supposedly enabled continuous production of the material with mixed or variable pore size and distribution from a single batch of nylon 46 solution.

As shown in example 4 of the patent, it appears that it was the heat exchanger combined with a bath having a different composition that was actually used to increase the pore size of the membrane produced from the solution batch and not thermal manipulation alone. While at least a part of the resulting pore size increase was attributed to the temperature increase, how much of the increase, if any, was due to the temperature increase or to the change in the bath composition is not discernible from the patent. Specifically, the patent teaches that smaller pore size material results from higher proportions of solvent in the bath. In Example 4, the cause of the resulting pore size increase is ambiguous at best, since the proportion of solvent in the bath was reduced from thirty two percent (32%) to twenty two percent (22%), in accordance with the previously known teaching for increasing pore size.

As described above, thermal manipulation to change the pore size in a membrane produced from a dope has long been recognized and has been used in reprocessing out of specification dope, as discussed above. However, this recognized property of the dope was dependent on raising the temperature of the dope to a temperature higher than that to which the dope had previously been processed. While this patent discusses controlling the process temperature as one factor in enabling continuous production of material with fixed or variable pore size from a single batch of nylon 46 solution, it fails to provide any specific temperatures other than a wide temperature range. Further, in the only example relative to varying pore size, the patent combines process temperature manipulation with the composition of the dope and the composition of the bath to effectuate the pore size change but only in one direction, from smaller to larger. There was no apparent effort to control the temperature of the solution at a specific temperature or any effort to try to lower the temperature of the solution to produce a smaller pore size.

Following the teachings of this particular patent, using thermal manipulation to change the pore size and viscosity of the mixture, as the solution is heated to higher temperatures, the viscosity of the dope becomes such that it might not be usable in a solution casting operation, unless controlled. Specifically, as the particular solution is heated to higher temperatures, processing problems will most likely be encountered including those related to viscosity, degassing of volatile components, foam formation and quenching problems, without adequate viscosity control.

The methods taught in this patent are not applicable to Marinaccio style Nylon 66 dopes and the membrane products produced therefrom, for the following reasons: 1) the patent is directed toward attempting to produce a skinned membrane, with a radically altered pore structure just below the qualifying skin layer. In this method, the quality and integrity of the skinned membrane is completely dependent on the quality of the first few microns of surface thickness. With this method, even the smallest imperfection (air entrapment, substrate fiber breach, etc.) in the skin will destroy the integrity of the product. For this reason, the methods disclosed in the patent must restrict the casting solution viscosity to a very narrow practical range, to ensure wetting of the substrate, minimization of entrapped air, and "smooth, even coating of the mixture", to ensure the integrity of the finished membrane product. There is, however, a practical limit to the solution viscosity; therefore a single stage thermal treatment and hot casting would potentially lower the viscosity to an impractical point, thus limiting the useful range of resultant pore sizes. 2) Additionally, the single stage thermal treatment and hot casting would be harmful to the resulting product, in that the volatile non-solvent components of the Marinaccio style dope (Methanol and Methyl Formate) will de-gas in an uncontrolled manner upon casting at a temperature above 34° C. (boiling point of Methyl Formate), and form bubbles, voids and other imperfections in the surface and matrix of the membrane. These voids are not desirable in commercial micropourous membrane.

In the end, the teaching of this patent appears ambiguous as to the effect of temperature alone on pore size because smaller pore size materials could result primarily from, 1) different casting dope solution formulations, or 2) higher proportions of solvents in the bath as it was known that a range of different pore sizes could be produced from a single solution by changing the proportions of solvents in the bath.

In summary, the prior art can be described as a non-real time predictive batch-type process that uses formulation to initially control pore size and bulk reheating as a predictive thermal manipulation to produce a predictive pore size to correct an improperly formulated batch, or improperly controlled initial mix cycle, sheer speed control to introduce the nonsolvent in the preparation of the dope as a batch of liquid to be processed into a membrane and bath solvent control in order to vary the pore size. In some prior art, discussed above, at the end of the formulation process, the dope had a viscosity related to the process temperature. There was no apparent attempt to independently control the viscosity of the dope prior to moving the dope to a membrane production apparatus.

One possible approach for solving the temperature control problem during dope batch formulation would be to precisely control the formulation of a single batch at a low temperature, less than the maximum temperature usually seen during the formulation of some specific batch formulations, for producing a specific pore size while maximizing the non-solvent to solvent ratio.

Since the formulation of different dope batches for each specific pore size microporous membrane being produced resulted in a considerable amount of the resulting microporous membrane being placed in inventory, systems and methods for producing any one of a plurality of specific pore sizes from a single master dope batch would be desirable. Such systems and methods should provide for the formulation of the master dope batch at a temperature equal to or below the target temperature for the smallest pore size of the possible plurality of pore sizes to be produced from the single master dope batch. Such systems and methods should provide for the incremental elevation of selected portions of the single master dope batch to any one of a plurality of target temperatures such that microporous membrane having any one of a plurality of corresponding pore sizes could be sequentially produced from a single master dope batch. Such systems and methods should provide for the temperature control of at least a portion of the single master dope batch to about ±0.2° C. of a target temperature prior to that portion at the target temperature being transferred to the microporous membrane casting step. Such systems and methods should provide for the accurate control of the temperature seen by substantially all of that portion of the dope to about ±0.15° C. prior to that portion of the dope being transferred to the microporous membrane casting step. Such systems and methods should eliminate the necessity for preparing a dope batch according to individual unique formulations for each pore size, thus resulting in significant cost savings and flexibility in the usage of dope batches. Such systems and methods should also provide the ability to selectively change the pore size of the microporous membrane being produced from a master batch after a certain amount of microporous membrane has been produced at one pore size and begin producing microporous membrane at another pore size utilizing the same master dope batch, resulting in significant cost savings and reduction of inventory of microporous phase inversion membrane produced.

SUMMARY OF THE INVENTION

It is, accordingly, one object of the present invention to provide systems and methods for the formulation of a master dope batch at a temperature equal to or below the temperature known to produce the smallest pore size in a microporous phase inversion membrane to be produced from the master batch by controlling the non-solvent, solvent, and polymer ratio at a specific temperature.

Another object is to provide systems and methods for incrementally elevating selected portions of a master dope batch to any one of a plurality of target temperatures such that any one of a plurality of corresponding pore sizes could be produced in microporous phase inversion membrane from a single master dope batch.

Still another object is to provide systems and methods for providing tight temperature control of the relatively small portion of a master dope batch being processed into microporous phase inversion membrane to about ±0.2° C. at a target immediately temperature prior to that portion at the target temperature being delivered to the microporous phase inversion membrane casting facility for continuous, high volume production of phase inversion membrane at a precise and substantially uniform pore size.

Yet another object is to provide systems and methods for accurately controlling the temperature seen by substantially all of the relatively small portion of the dope to about ±0.15° C. prior to that relatively small portion of the dope being immediately delivered to the microporous phase inversion membrane casting facility for continuous, high volume production of phase inversion membrane at a precise and substantially uniform pore size.

Another object is to provide systems and methods for eliminating the necessity for formulating unique individual dope batches for each microporous phase inversion membrane pore size to be produced, thus resulting in significant cost savings and flexibility in production runs using one master dope batch.

Still another object is to provide systems and methods having the ability to change the pore size of the microporous phase inversion membrane being produced after a certain amount of microporous phase inversion membrane has been produced at one pore size and begin producing microporous phase inversion membrane at another pore size utilizing the same master dope batch, resulting in significant production cost savings including the reduction of inventory for multiple pore size microporous phase inversion membrane.

In one of its broader aspects, objects of the invention can be achieved by providing methods for processing at least a portion of a single ternary phase inversion polymer master dope to produce a microporous phase inversion membrane having any one of a plurality of different predetermined pore sizes, the method comprising the steps of: formulating a ternary phase inversion polymer master dope having a predetermined polymer to non-solvent to solvent ratio at a specific mixing temperature; and elevating the temperature of at least a portion of the master dope batch to a temperature higher than the specific formulation mixing temperature no higher than within about ±0.2° C. of a predetermined temperature such that at least the portion of the dope at the elevated temperature when processed produces a microporous phase inversion membrane having pores formed therein substantially corresponding to a predetermined pore size.

In another of its broader aspects, objects of the invention can be achieved by providing methods for processing a single ternary phase inversion polymer master dope batch having a predetermined minimum pore size forming capability in microporous phase inversion membranes into any one of a plurality of different sized pores in microporous phase inversion membrane, the method comprising the steps of: elevating the temperature of at least a portion of the ternary phase inversion polymer master dope batch to a temperature no higher than within about 2° C. below a predetermined temperature; and further elevating the temperature of the portion of the dope previously elevated to a temperature no higher than within about 2° C. below the predetermined temperature to a temperature no higher than within about ±0.2° C. of the predetermined temperature.

In yet another of its broader aspects, objects of the invention can be achieved by providing a system for controlling the thermal manipulation of a ternary phase inversion polymer master dope to a temperature no higher than a predetermined temperature prior to delivery of the dope to a processing site, the system comprising: a vessel for containing a ternary phase inversion polymer master dope, the dope having been exposed to a mixing temperature which is no higher than the temperature necessary to effect dissolution and equilibrium mixing of the polymer, solvent and nonsolvent, the vessel and the dope contained therein being maintained at a temperature nominally lower than the mixing temperature, such temperature being sufficient to stabilize and maintain the mixture after cooling from the mixing temperature; a pump, operatively connected to the vessel, for transporting the dope from the vessel to a dope processing site; and heating means, operatively connected to the pump, for elevating the temperature of at least a portion of the dope to a temperature within about ±0.2° C. of the predetermined temperature, the predetermined temperature being selected from a calibrated characterization curve which describes the relationship between the dope being processed and the resulting pore size in the formed membrane.

In still another of its broader aspects, objects of the invention can be achieved by providing a system for continuously controlling the mixing temperature of a ternary phase inversion polymer master batch of dope formulated at a predetermined polymer to non-solvent to solvent ratio at a temperature no higher than within about ±1.0° C. of a target formulation temperature, the system comprising: a storage vessel for maintaining the ternary phase inversion polymer master batch of dope at a controlled maximum storage temperature, the storage temperature being nominally lower than the target formulation mixing temperature; pump means, operatively connected to the storage vessel, for sequentially transporting the dope from the storage vessel to a casting apparatus; and heating means, operatively positioned between the pump means and the casting apparatus, for increasing the temperature of a small portion of the dope, as the small portion of the dope moves through the heating means, to a temperature no higher than within about ±0.2° C. of the predetermined temperature.

An additional aspect of the present invention includes, controllably cooling the dope, after having been thermally manipulated, to a temperature sufficiently lower than the predetermined temperature in order to stabilize the casting dope and bring the dope to an appropriate viscosity and temperature for phase inversion membrane formation.

Other objects and advantages of the invention will be apparent from the following description, the accompanying drawings and the appended claims.

DETAILED DESCRIPTION OF THE INVENTION

Figure 1:
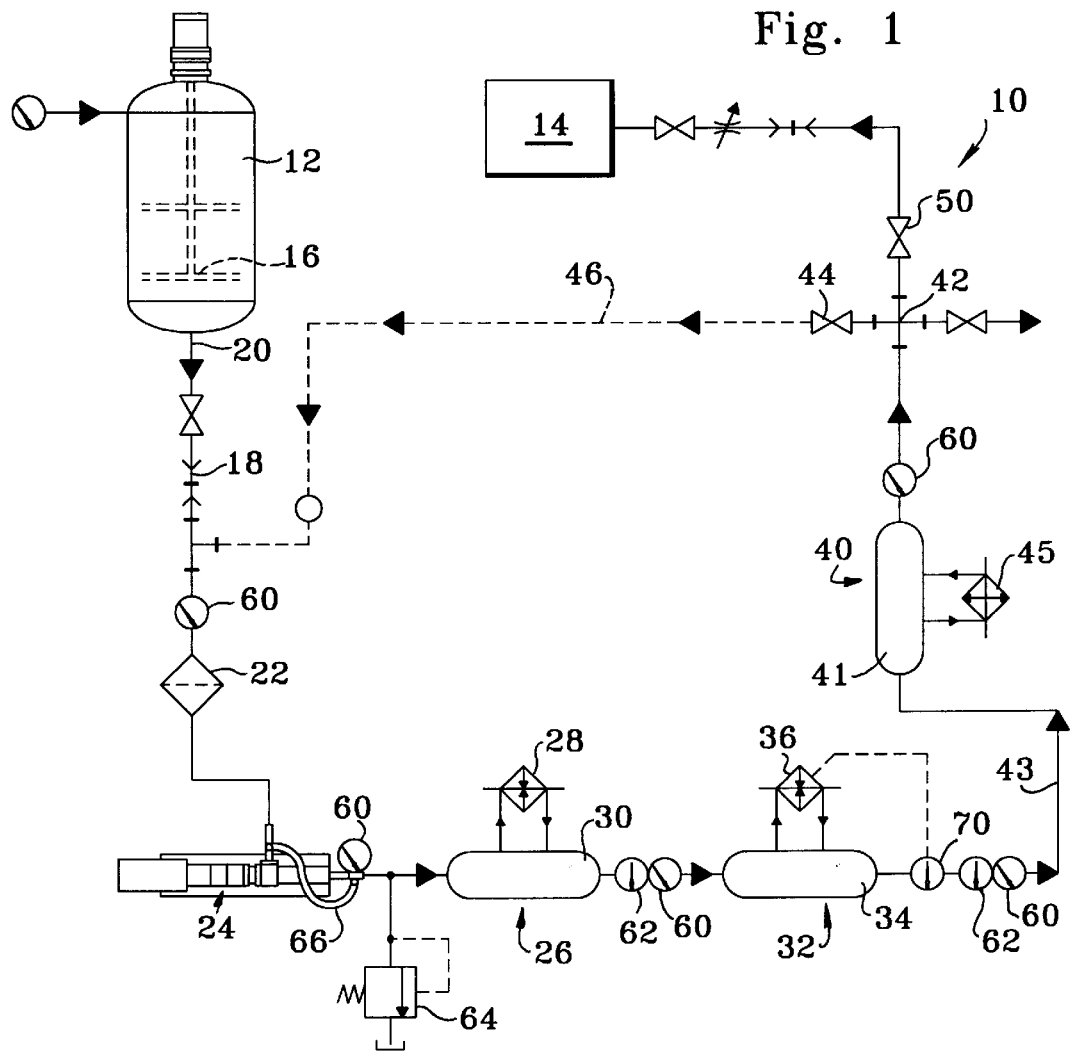
FIG. 1 is a schematic illustration of a representative system of the present invention for carrying out the methods of present invention.

Microporous phase inversion membranes produced using the systems and methods of the present invention are preferably produced from nylon. The term "nylon" is intended to embrace film forming polyamide resins including copolymers and terpolymers which include the recurring amino grouping and blends of different polyamide resins. Preferably, the nylon is a hydrolytically stable nylon possessing at least about 0.9 moles of amino end groups per mole of nylon as described in U.S. Pat. No. 5,458,782, the contents of which are incorporated herein by reference.

While in general the various nylon or polyamide resins are all copolymers of a diamine and a dicarboxylic acid, or homopolymers of a lactam and an amino acid, they vary widely in crystallinity or solid structure, melting point, and other physical properties. Preferred nylons for use with the methods and systems of this invention are copolymers of hexamethylene diamine and adipic acid (nylon 66), copolymers of hexmethylene diamine and sebacic acid (nylon 610), homopolymers of polycaprolactam (nylon 6) and copolymers of tetramethylenediamine and adipic acid (nylon 46). These preferred polyamide resins have a ratio of methylene ($CH_2$) to amide (NHCO) groups within the range of about 4:1 to about 8:1, most preferably about 5:1 to about 7:1. The nylon polymers are available in a wide variety of grades, which vary appreciably with respect to molecular weight, within the range from about 15,000 to about 42,000 (number average molecular weight) and in other characteristics.

The highly preferred species of the units composing the polymer chain is polyhexamethylene adipamide, i.e. nylon 66, having molecular weights above about 30,000. Polymers free of additives are generally preferred, but the addition of antioxidants, surface active agents, charge modifying agents or similar additives may have benefit under some conditions.

As mentioned in the background, one conventional method for processing dope containing the above mentioned polamide resins into microporous phase inversion membrane is carried out by formulating a specific dope according to a known formula to produce a certain pore size when the dope is cast into microporous phase inversion membrane. The dope comprises a polymer, a solvent and non-solvent in a specific predetermined amount mixed and stored in a sealed storage vessel. Once the dope batch is formulated in accordance with a predetermined formula under controlled conditions including a maximum mixing temperature, the dope is then pumped to a casting line and at that point cast into a microporous phase inversion membrane.

As was indicated above in describing the background of this art, one of the problems discovered was the inconsistency of pore sizes obtained from conventionally formulated dope batches supposedly identically formulated and controlled to a specific maximum temperature and mix history during formulation. However, when some of these out of specification dope batches were reprocessed at a supposedly higher target temperature, there was no noticeable change in the pore size of the phase inversion membrane produced therefrom. Thus, it became evident that once the dope was heated to a certain temperature, the pore size formed in microporous phase inversion membrane produced from that dope could not be changed to a smaller pore size when the dope was reprocessed by reheating to a temperature lower than the temperature to which the dope had already been elevated. In other words, when this phenomenon occurred, the temperature to which the dope had been exposed to during formulation was in fact higher than that to which it was believed the dope had been exposed. This indicated that exacting process control of dope temperature during formulation was important in order to achieve the target specification pore size for the microporous phase inversion membrane.

It has now been determined that once a dope has been processed at a certain temperature, and that temperature is a temperature higher than the temperature necessary to produce a particular pore size, then the dope retains the memory of having been processed at the higher temperature. Thus, even though the dope had been cooled to room temperature, reheating the dope to a temperature lower than that temperature previously attained during formulation or reheating, any microporous phase inversion membranes produced therefrom would have pores corresponding to the pore size of the highest temperature at which the dope had previously been processed. The smallest possible pore size was a direct result of the thermal history of the specific dope batch. Thus, thermal heat treatment of dope only works in one direction and that is to enlarge the pore size of the resultant membrane, not to decrease pore size of the resultant membrane. Specifically, it has now been determined that there is a temperature memory associated with the polymer mixture and that the pore size in any membrane produced therefrom is associated with the highest temperature to which the polymer mixture has been exposed prior to being processed into membrane.

The systems and methods of the present invention modify the prior methods and systems described in the background to take advantage of this thermal memory by presently preferably formulating a single master dope batch, under tightly controlled conditions, in a vessel at a low temperature, typically about 21° C. to about 34° C. and, presently preferably, at the maximum non-solvent to solvent ratio possible, at the specific formulation weight percentage of the polymer, it being understood that the master dope batch is formulated at a temperature below the temperature normally associated with the formation of the smallest desired pore size to be produced in membrane from that particular master dope batch formulation,. Only a relatively small portion of the master dope batch contained within the vessel is transported via a pump, preferably a metering pump, from the vessel to a, presently preferably, first heating zone for elevating the temperature of that relatively small portion of the dope. Then, the smaller portion of the dope is pumped to a, presently preferably, second heating zone for incrementally elevating the temperature of the dope to a target temperature. The dope is then, presently preferably, pumped to a cooling zone where the dope is cooled to a temperature and a viscosity sufficient for processing into microporous phase inversion membrane, it being understood that the viscosity of the cooled dope, already thermally manipulated to produce a specific pore size, may be independently manipulated by controlling the cooling temperature in order to optimize the viscosity of the dope at the casting apparatus.

The, presently preferred, master dope for producing the widest range of possible pore sizes from the smallest to the largest pore size is formulated to provide a dope with the maximum non-solvent to solvent ratio attainable at the specific formulation weight percentage of the polymer. It is understood that the ratio of non-solvent to solvent could be less than the maximum and still produce a range of pore sizes but not necessarily provide the maximum flexibility to produce phase inversion membrane having the widest possible range of pore sizes.

Once the relatively small portion of the master dope batch has been pumped from the vessel to the first heating zone, the temperature of the small portion of the dope in the first heating zone is, presently preferably, elevated to within about 2° C. below a predetermined target temperature. The predetermined target temperature can be any of a plurality of possible target temperatures at which the dope has been determined to yield a particular microporous phase inversion membrane pore size when processed into microporous phase inversion membrane. The temperature of the dope within that first heating zone is, presently preferably, elevated to within about ±0.5° C. of about 2° C. below the target temperature by using temperature control apparatus, as will be explained below. Thus, the highest temperature, that the small portion of the dope will be exposed to during the movement of the dope through the first heating zone is, presently preferably, about 1.5° C. below each specific predetermined target temperature.

After achieving the desired temperature of about 2° C. below the specific target temperature in the first heating zone, the relatively small amount of dope is further processed through a second heating zone wherein the temperature of the dope is further elevated and controlled to, presently preferably, within about ±0.15° C. of the one specific target temperature. Upon achieving a dope temperature of about ±0.15° C. of one specific target temperature, the dope exits the second heating zone and is, presently preferably, cooled in a cooling zone to a casting temperature, presently preferably about 21° C., or other temperature that provides the dope with an appropriate viscosity for casting and, after sampling and testing, is further pumped to a microporous phase inversion membrane casting facility for processing into microporous phase inversion membrane having the predetermined pore size corresponding to the target temperature. It is an important advantage of the present invention that the dope is thermally manipulated to a precise predetermined temperature that produces a specific pore size in microporous phase inversion membrane and is then cooled back down to a temperature which independently controls the viscosity of the dope during the casting process, all within about ten (10) minutes, considerably less time than any known process has previously controlled the temperature elevation phase alone during, such as, reprocessing an out of specification dope.

After exiting the dope cooling zone, a valve located in the dope process line provides for the withdrawal of dope samples from the line for testing to ensure that the dope will produce microporous phase inversion membrane having the specific pore size desired. Additionally, the valve also provides for the recirculation of the dope after the dope exits the cooling zone and returns the dope to the dope process line at a point prior to the first heating zone or other location, as appropriate.

Another important advantage of the methods and systems of the present invention includes the surprising ability to produce, from a single mother dope, phase inversion membrane having a range of pore sizes greater than previously produced, from about 0.05 microns or smaller to about 50 microns larger, an order of magnitude of about three (3). Micropourous Membrane production can be accomplished in any sequence as long as the desired pore size is not one that requires an initial formulation mixing temperature less than the formulation mixing temperature of the mother dope.

The methods and systems of the present invention use real time essentially instantaneous, about ten (10) minutes or less and no more than about five (5) to about (20) twenty minutes for the total temperature manipulation cycle as opposed to three to five hours for the prior art, thermal manipulation to independently control casting viscosity and resulting phase inversion membrane pore size in the production of phase inversion membrane. The systems and the methods of the present invention are designed to exploit, to the maximum advantage, the thermal memory of the phase inversion membrane casting dopes.

In the systems and methods of the present invention, temperature manipulations occur between the inlet to the first heat exchanger and the outlet of the final cooling means or heat exchanger. A volume of about five gallon of the dope is being processed through the temperature manipulation means (heat exchangers) at any one time between those two points at a speed of about one half (0.5) to about three quarters (0.75) of a gallon per minute (GPM). At a process speed of about one half gallon per minute, the about five (5) gallons of dope are thermally manipulated in about ten (10) minutes or less to a point where the dope is ready for casting at a casting apparatus. The temperature manipulation of the systems and methods of the present invention is accomplished by precisely controlling the temperature of the dope as the dope is pumped through each of the heat exchangers to a very precise point over a large surface area or heat transfer area within the first and third heat exchangers so that essentially each element of the fluid sees essentially the same temperature manipulation. In the second heat exchanger, the static mixer/heat exchanger continuously pushes fluid, such as dope, from the center of the heat exchanger to the wall than back to the center again, substantially eliminating thermal gradients and boosting the inside film coefficient to essentially convert laminar flow to turbulent flow to enhance mixing.

An illustrative system utilized for preparing, pumping and controlling the temperature of a master dope batch to a predetermined target temperature to produce a predetermined pore size in a cast microporous phase inversion membrane in accordance with the methods of the present invention is described below. Referring now particularly to the accompanying drawings, FIG. 1 is a schematic representation of one representative system 10 for implementing the methods of the present invention. As shown in FIG. 1, a plurality of processing stations and processing mechanisms beginning with the master batch of dope contained in the storage vessel 12 and ending with the dope being processed at a membrane casting station 14 into microporous phase inversion membrane.

The membrane production process begins by formulating a master batch of dope by mixing various constituents known in the art in a conventional dope storage vessel 12. Dope preparation is similar to the dope preparation discussed in U.S. Pat. No. 4,645,602, issued on Feb. 24, 1987, assigned to the assignee of the present application, which has already been incorporated herein by reference. The sealed storage vessel 12 is typically maintained in a nitrogen atmosphere from about zero (0) to about fifty (50) psig. The storage vessel 12 includes conventional temperature control means, such as, for example, a water or liquid jacket surrounding the dope and conventional fluid mixing means 16 such as a rotating device for agitating the dope inside the storage vessel 12. Fluid transport means 18, such as, for example, conventional pipe or hose, are operatively connected to the bottom 20 of the vessel 12 for sequentially transporting a small portion of the dope, after stabilizing the formulation, initially at a temperature of about 21° C. (or any suitable initial processing temperature for the dope) contained in the vessel to a casting apparatus.

Figure 2:
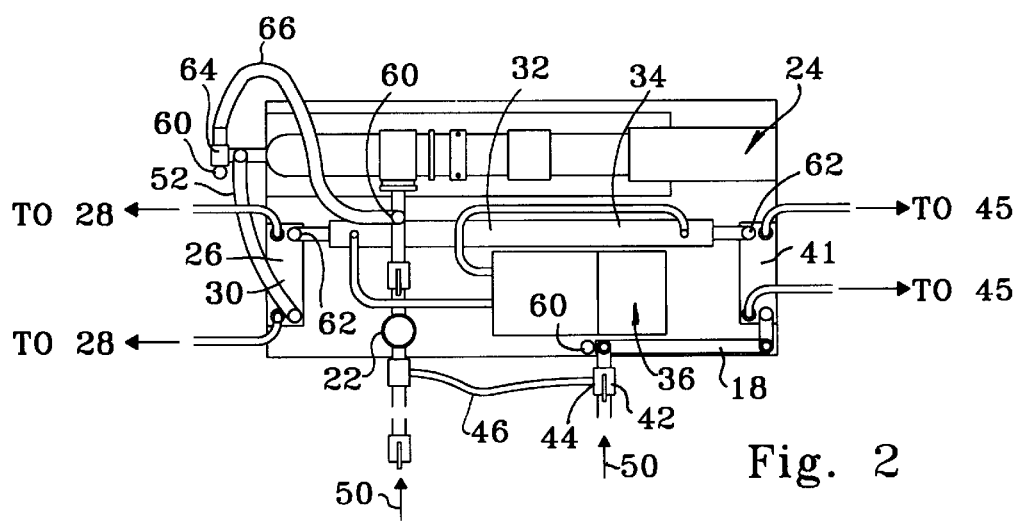
FIG. 2 is a plan view of a representative configuration for the pump, the heating means and the cooling means useful for carrying out the methods of the present invention.

A, presently preferably, 150 micron filter 22 for separating foreign matter, solid contaminants and any suspended particulate solid particles from the dope is operatively positioned in the hose. As shown in FIG. 2, one filter 22 found to be useful in performing this function is, presently preferably, a CTG-KLFAN filter housing manufactured by CUNO as Part No. 1WTSR1 with a 150 micron cartridge installed.

Further downstream from the vessel 12 is a metering pump 24 for incrementally transporting a relatively small portion of the dope contained in the vessel 12 from the vessel to the membrane casting site 14. One pump found to be useful for this function is a Moyno Pump manufactured by Robbins & Myers as model 2L3 SST CAA, 316 Stainless Steel/Teflon Moyno Pump.

Downstream from the pump 24 and operatively connected thereto is a first means or first heating means 26, for elevating or increasing the temperature of the small portion of the dope to within, presently preferably, about 2.0° C. below a predetermined temperature. As shown in FIG. 2, the first heating means 26 includes a temperature controller 28, (shown schematically in FIG. 1). One specific model temperature controller found useful for this function is an Aquatherm-mold temperature controller having about a ±1° C. accuracy (Model No. RA1208 including the optional mercury contactors and a motorized modulation valve, 12KW, ¾ HP pump rated at a flow of about 40 GPM at about 17 psi). The temperature controller 28 is operatively connected to a plate heat exchanger 30, presently preferably, having about a twenty (20) square foot heat transfer area or any area sufficient to accomplish the temperature elevation of the dope to about 2.0° C. below a predetermined target temperature. Such a plate heat exchanger 30 is available from Tranter, as Model No. MX-20-0412-UP-080/0.060. Preferably, the controller 28 is configured to measure the process fluid (water) in the opposite direction of dope flow (counter current).

After exiting the first heating means 26, the dope is, presently preferably, transferred to a second means or second heating means 32 for further increasing or elevating the temperature of the dope. The second means 32, presently preferably, consists of a jacketed pilot mixer/heat exchanger 34 such as, for example, those available from Chemineer as a Kenics HX-1 Jacketed pilot mixer/heat exchanger, Part No. 033-00210. The temperature of the mixer/heat exchanger 34 is, presently preferably, controlled by a heated/refrigerated circulating water bath programmable controller 36 having a temperature control capability of about ±0.01° C. with a display having an accuracy of only about ±0.2° C. One programmable controller found useful to perform this function is available from VWR, Model No. 1167, with the dope temperature being controlled by an external resistance temperature device (RTD) 70. Preferably, the controller 36 is configured to measure the process fluid (water) in the opposite direction of dope flow (counter current).

After the dope has been processed through the second heating means 32 and after the dope temperature has been elevated to about ±0.15° C. of the target temperature, the dope is then cooled in a cooling means 40. The cooling means 40 includes a heat exchanger 41 and a controller 45. The cooling means 40, is used to reduce the temperature of the relatively small amount of dope exiting the second heating means 32 at the target temperature to the ambient casting temperature of about 21° C., or other temperature which provides an appropriate dope viscosity, while the dope is being processed through a heat exchanger 41 having about a 20 sq. ft. heat transfer area. One heat exchanger found to be acceptable to perform the heat exchanger function is a Tranter, Model No. MX-20-0412-UP-080/0.060 heat exchanger. Apparatus found useful to perform the control function is a Thermal Care Accuchiller Model NO. AQOAO3 air cooled portable chiller having a temperature control accuracy of about ±1° C. Preferably, the controller 45 is configured to measure the process fluid (water) in the opposite direction of dope flow (counter current).

After the dope is cooled in the cooling means 40, the dope is pumped to a valve 42 operatively positioned in the dope process loop 18 where samples of the dope exiting the cooling means 40 to can be drawn and tests can be run thereon to determine the pore size that the dope will produce in microporous membrane after casting. Another position 44 for the valve 42 provides for dope recirculation within the dope process line to a position between the storage vessel 12 and the metering pump 24 or other appropriate location.

When the valve 42 is in the recirculation position 44, a recirculation loop 46 can be actuated, which enables the system to reach a steady state temperature prior to the membrane casting being commenced. Additionally, running in the recirculation loop 46 prevents the production of out-of-specification microporous phase inversion membrane until after receiving the test results from the samples taken of the dope exiting the cooling means 40. Once it is determined that the dope has, in fact, been stabilized at the appropriate predetermined target temperature for producing the appropriate pore size in microporous membrane, then the valve 42 can be moved to position 50 to deliver the dope to the membrane casting site 14.

Additional components of the dope processing system include pressure gages 60 positioned at various locations as shown in FIG. 1. The pressure gages positioned on either side of the pump 24 obtain the differential pressure across the pump and the head pressure to the pump. Additional pressure gages are operatively positioned down stream from each heat exchanger means, 26, 32, and 40 to monitor the pressure drop after the dope has processed through each heat exchanger means for undesirable pressure build up.

Omega thermistors 62 having a precision of about ±0.15° C. are operatively positioned on the downstream sides of the first 26 and the second 32 heat exchanger means for providing a more accurate temperature reading of the down stream process than the Accutherm or the VWR units displays are capable of providing. The thermistors 62 provide the capability to read the temperature to an accuracy of about ±0.15° C. for increased temperature control whereas the VWR unit is capable of controlling the temperature to ±0.01° C., it has a more limited readout capability of only about ±0.2° C. One additional feature in the system of the present invention includes, a pressure relief valve 64 operatively positioned in the loop 18 for protecting the system from damage from excess pressure buildup by taking the pump out of operation should the pressure exceed a predetermined pressure, presently about 250 psi. If the pressure were to exceed a certain pressure, then the dope would be recirculated through the pump via hose 66 (see FIG. 2).

An RTD 70 is operatively positioned in the loop and connected to the VWR recirculation bath 36 for controlling the temperature of the dope in the second heat exchanger means 32. Another RTD probe (not shown) is located inside the VWR recirculation bath 36. In operation, the external RTD probe 70 is the controlling loop unless the probe indicates that the temperature of the dope is outside the maximum setpoint differential, control reverts back to the internal RTD probe for controlling the process to the setpoint. The VWR is a proportional band controller having the two above described RTDs, one internal and one external to minimize the temperature differential between the dope and the process fluid.

It is believed possible for systems utilizing the methods of the present invention to combine the first 26 and second 32 heating means into a single heating means, if appropriate temperature control equipment were available so that the resulting temperature coming out of the single heating means could be controlled to within at least about ±0.2° C. of the target temperature. However, at the time of this invention, no apparatus capable of such control was known to be commercially available.

The present invention or Dial-A-Por™ system is, in its presently preferred embodiment, a two stage system which uses the high temperature memory of a casting dope to control pore size, and the cooling cycle to independently control the viscosity of the dope at a casting apparatus. In this manner, the thermal manipulation of the dope alone is sufficient to produce a wide range of commercially useful phase inversion membranes from a single starting dope.

EXAMPLES

A program was launched to investigate real time thermal manipulation/heat treating of MARINACCIO style dopes (U.S. Pat. No. 3,876,738) in-line with membrane casting equipment. It was believed that the development of such systems and methods related thereto would eliminate the conventional single batch formulation for each pore size phase inversion membrane and the conventional rework/reheating process for out of specification batches.

Upon review of some previous test data, it was determined to establish the temperature control parameters of ±0.2° C. with mixing at the target temperature/Tmax for the initial test system. The target temperature control parameters were established by reviewing the system dynamics, such as the energy required to achieve the target temperature and the logic necessary to control that target temperature to a tight tolerance of about ±0.2° C. It was determined by calculations that the heat exchangers selected for the trial system to elevate the dope temperature were sized properly, but the initial temperature control achieved was only about ±2° C. (±7° F.) relative to the target temperature using only one heat exchanger to raise the temperature of the dope.

Since it was believed necessary to control the target temperature of the dope to about ±0.2° C., and since the equipment could control the temperature of the dope to only about ±2° C., further temperature control had to be achieved in order to produce the desired tight temperature control of the dope. Thus, it was decided to divide the thermal processing of the dope into two separate heating means for tighter temperature control. This technique reduces the thermal energy needed for the second heating means to less then 1 KW of energy, which equates to a 2° C. raise in dope temperature. The existing plate heat exchanger would be used for incrementally adjusting the temperature of the dope from ambient to within about 2° C. below the target temperature/Tmax. The thermocouple was inserted into process fluid instead of the dope stream, this control method eliminates the cascading effect caused by fluid flow and pressure changes in the dope, in the first heat exchanger. The proportional band parameters where then adjusted to achieve temperature control to ±1° C. for the heating means, as verified by the down stream thermistor.

Considering that dope is such a viscous material (from about 2000 centipoise or below to about 5000 centipoise or above, depending on the formulation recipe), a static mixer/heat exchanger was selected as the second heating means. The static mixer/heat exchanger heating means utilized static mixing elements to improve thermal performance in achieving the desired temperature control. As is known, the static mixer/heat exchanger continuously pushes fluid, such as dope, from the center of each element to the wall than back to the center again, substantially eliminating thermal gradients and boosting the inside film coefficient. With such a static mixer/heat exchanger, temperature control of the second heating means was attained by using two RTD's (resistance temperature device), one located in the process bath and the other in the dope stream. A microprocessor was utilized to maintained a maximum temperature differential between the two RTDs to within about ±3° C. Utilization of this temperature control scheme eliminated any cascading effects which might have occurred by having a single RTD positioned in the dope stream. In the end, temperature control of the target temperature/Tmax was achieved to about ±0.15° C. with mixing, thereby exceeding the original system requirements of about ±0.2° C.

An initial test run using the system described in detail above was initiated to determine whether thermal manipulation could effect the pore size distribution of a single mother dope. The following are the measurements and test procedures utilized in all the Examples.

The dry membrane thickness was measured with a ½ inch (1.27 cm) diameter platen dial indicator thickness gauge. Gauge accuracy was about ±0.00005 inches (±0.05 mils). Initial Bubble Point (IBP), Foam-All-Over Point (FAOP) and Flow Rate tests are all described in detail in U.S. Pat. No. 4,645,605.

Example 1

An initial test run using the system described in detail above was initiated to determine whether thermal manipulation could effect the pore size distribution of a single mother dope. One test objective was to establish a curve for Nylon 66* (Monsanto Vydyne 66Z) dope.

(1) A mother dope of approximately 14.5 percent by weight Nylon*, 77.4 percent by weight Formic Acid and 8.1 percent by weight methanol, was produced from nylon by the method disclosed in U.S. Pat. Nos. 3,876,738 and 4,645,602. Another method for producing such membranes is described in European Patent Application No. 0 005 536 to Pall.

The dope was processed in vessel (#4), head (#1) to a maximum temperature of about 34° C. which resulted in a FAOP of about 146.5 psi and a IBP of about 131 psi. (2) The storage vessel containing the above mother dope was pumped to the Dial-A-Pore™ pilot unit for thermal manipulation. After steady state was achieved for the second heating means, thermistor (±0.2° C.) at a flow rate of about 700 ml/min (0.19 gpm), a dope sample was taken. During the test, the flow was adjusted using a strobe tachometer then verified using a stop watch and a graduated cylinder. Ex: 20 RPM=700 ml/min.

The dope samples were collected in the following order:

Control sample @34° C. (mother dope as received)

35° C. (Tmax) (take sample), Recirculate for 20 min (take sample);

Tmax+5° C. (take sample), Recirculate for 20 min (take sample);

Tmax+10° C. (take sample), Recirculate for 20 min (take sample);

Tmax+15° C. (take sample), Recirculate for 20 min (take sample);

Tmax+20° C. (take sample), Recirculate for 20 min (take sample).

Tmax+25° C. (take sample), Recirculate for 20 min (take sample)

Each sample bottle was labeled with the dope number and the temperature.

The samples were then processed as follows:

1) Two (2) laboratory casts were performed for each sample.

2) Samples were labeled by dope number and temperature.

3) Samples were double layer dried using a 6" diameter tapestry hoop to constrain the sample during drying.

4) Three locations per laboratory cast were measured.

5) Data was recorded.

The results of the tests are tabulated below in the Tables.

In each of the following examples, the dope was transferred into a sealed storage vessel. Then, samples were taken for laboratory casting to serve as the control samples. Next, the dope processing system for elevation of the dope temperature to a predetermined temperature was activated and the target temperature was set to the specific target temperature of the delivered mother dope. Next, the VWR circulation bath was checked for calibration of the external RTD (after Example 2). Power to the accuchiller was activated and the target temperature of 21° C. was set and the accuchiller pump was activated. The metering pump (moyno) was activated to circulate the hold up volume of the system, about five (5) gallon of dope. When the two heating means and the cooling means reached their respective target temperatures, a trial run was commenced in accordance with the above described test protocol.

Figure 3:
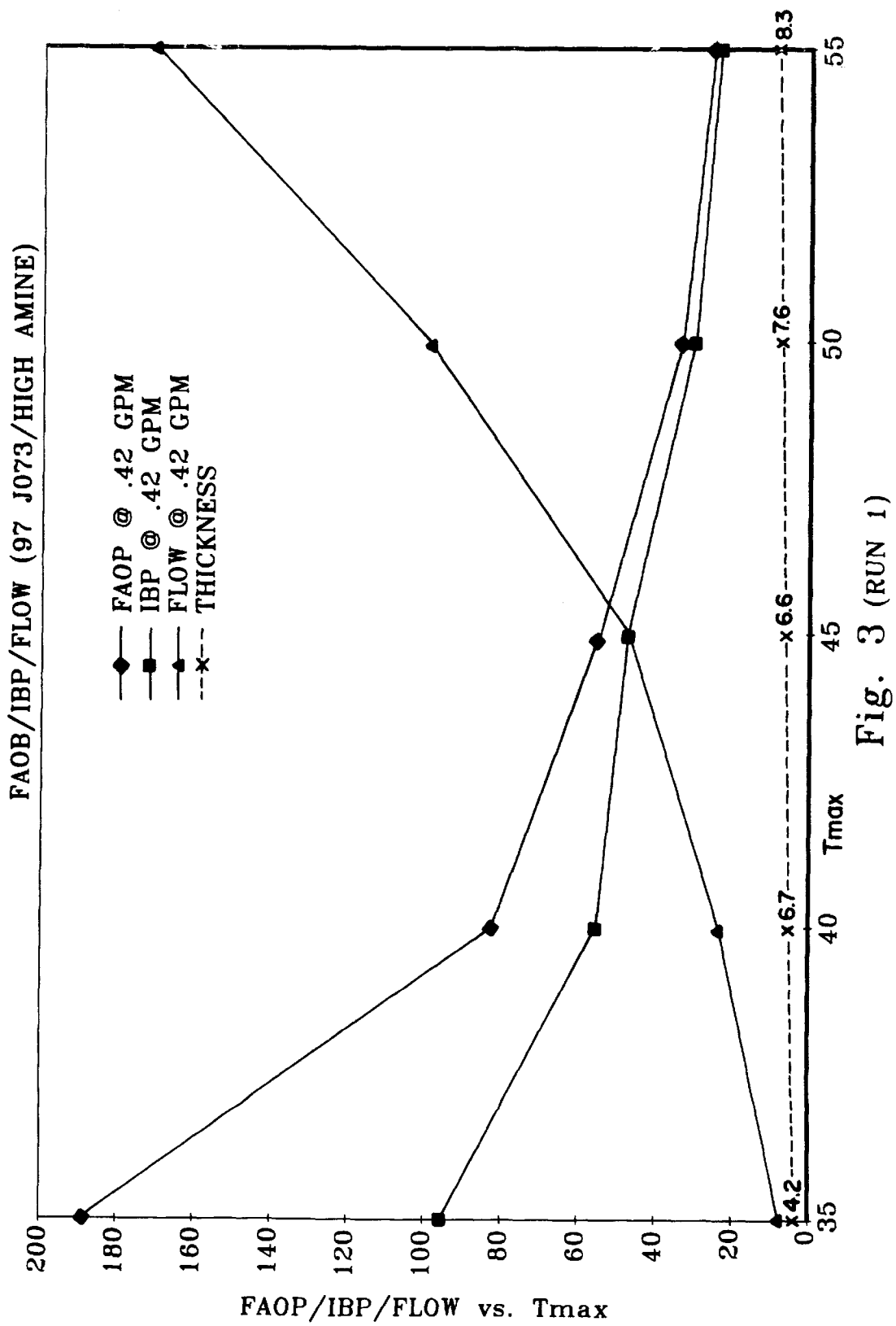
FIG. 3 is a graph illustrating the data depicted in Table 1 for Example 1.

The data for establishing a curve for high amine dope (IBP/FAOP/FLOW vs. Tmax) and to determine what thermal effect, if any, the system might have on the master dope is shown in Table 1 below. The curves from the data is shown in FIG. 3.

TABLE 1

| Tmax | FAOP | IBP | Flow | THICK | IBP/FAOP |
|---|---|---|---|---|---|
| 34 | 207.2 | 123.2 | 12.2 | 5.2 | 0.595(mother dope) |
| 34 | 172.2 | 120.4 | 11.7 | | 0.699 |
| 35 | 188.5 | 95.7 | 8.1 | 4.2 | 0.508 |
| 40 | 82.6 | 55.5 | 23.7 | 5.7 | 0.672 |
| 45 | 54.8 | 47.7 | 47.3 | 6.6 | 0.87 |
| 50 | 33.5 | 30.2 | 99.5 | 7.6 | 0.901 |
| 55 | 25.0 | 23.2 | 170.4 | 8.3 | 0.928 |

During this Example, a 10 psig pressure fluctuation in head pressure was observed. The progressive cavity pump pulled a vacuum on the inlet side of the system. Temperature control fluctuated by about ±0.5° C. There was no monitoring of the first heating zone dope stream temperature.

The results of this initial Example were encouraging in that temperature control improved to about ±0.5° C., as opposed to previous runs that had reported temperature control to no better than ±2° C. with 30 psig fluctuations in dope pressures across the heat exchangers in the heating zones.

As illustrated in FIG. 3, the dope appeared to respond to the thermal inputs received from the system.

Example 2

After addressing the pressure fluctuation problems by correcting the size of the filter in the process line, the vacuum and the monitoring problems identified in Example 1, a second Example was conducted using a standard amine dope, Nylon 66 (Monsanto Vydyne 66B)* dope. The mother dope consisted of about 16% by weight Nylon*, 76.5% by weight Formic Acid and 8.1% methanol.

Figure 4:
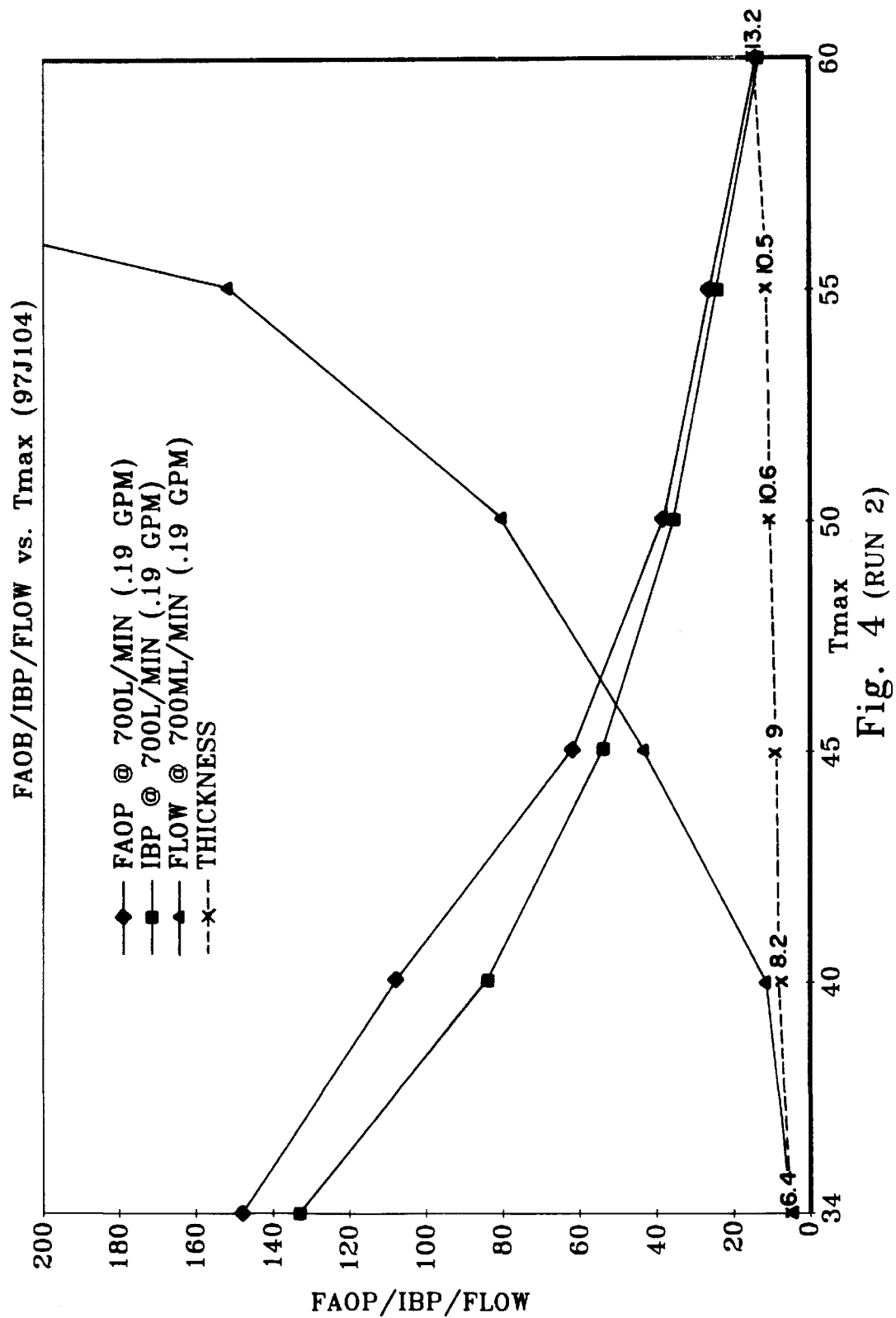
FIG. 4 is a graph illustrating the data depicted in Table 2 for Example 2.

The results of the second Example are shown in Table 2 and FIG. 4.

TABLE 2

| Tmax | FAOP | IBP | Flow | THICK | IBP/FAOP |
|---|---|---|---|---|---|
| 34 | 145.6 | 130.7 | 5.4 | 6.4 | 0.898(mother dope) |
| 40 | 106.0 | 82.5 | 11.5 | 8.2 | 0.781 |
| 45 | 61.0 | 53.2 | 42.8 | 9.0 | 0.872 |
| 50 | 37.4 | 34.8 | 78.9 | 10.6 | 0.930 |
| 55 | 25.0 | 23.4 | 148.6 | 10.5 | 0.936 |
| 60 | 12.9 | 11.5 | 408.6 | 13.2 | 0.892 |

System performance problems that were observed during the second example, including the 10 psig fluctuations in head pressure and the vacuum on the inlet side of the pump, were eliminated by changing the membrane size in the filter from 30 to 150 microns. This filter size change made it possible to maintain a positive 20 psig pressure on the pump. Table 2 above and FIG. 4 illustrate a smooth response to temperature with a tight IBP to FAOP ratio.

As a result of Example 2, it was concluded that the system again responded to thermal input with no pressure fluctuations. It was also determined that the high amine test should be reproduced with the current equipment modifications and that the control loop should be closed using an external RTD probe installed in the dope stream of the second heating zone. Example 1 had been conducted in an open loop mode, controlling the bath temperature/process temperature of the heat exchanger. In Example 2, dope temperature was held to about ±0.2° C. of the target temperature, possibly due to the reduction of pressure fluctuations in the heat exchangers.

Example 3

A third example having as an objective to develop a curve for high amine nylon (Nylon 66,* Monsanto Vydyne 66Z) in 1° C. increments was conducted.

In preparation for the third example, certain equipment modifications to the system were made. These modifications included installation of an external RTD after the second heating means in the dope stream. Programming the controller to minimize the cascading effect of the external probe. The controller monitored both the internal and external probes to minimize the setpoint differential between process fluid and dope temperatures. The proportional band parameters on the first heating means and the cooling means (Aquatherm & Accuchiller) were optimized to optimize temperature control by tightening the proportional band from about 3° C. to about 1° C.

Figure 5:
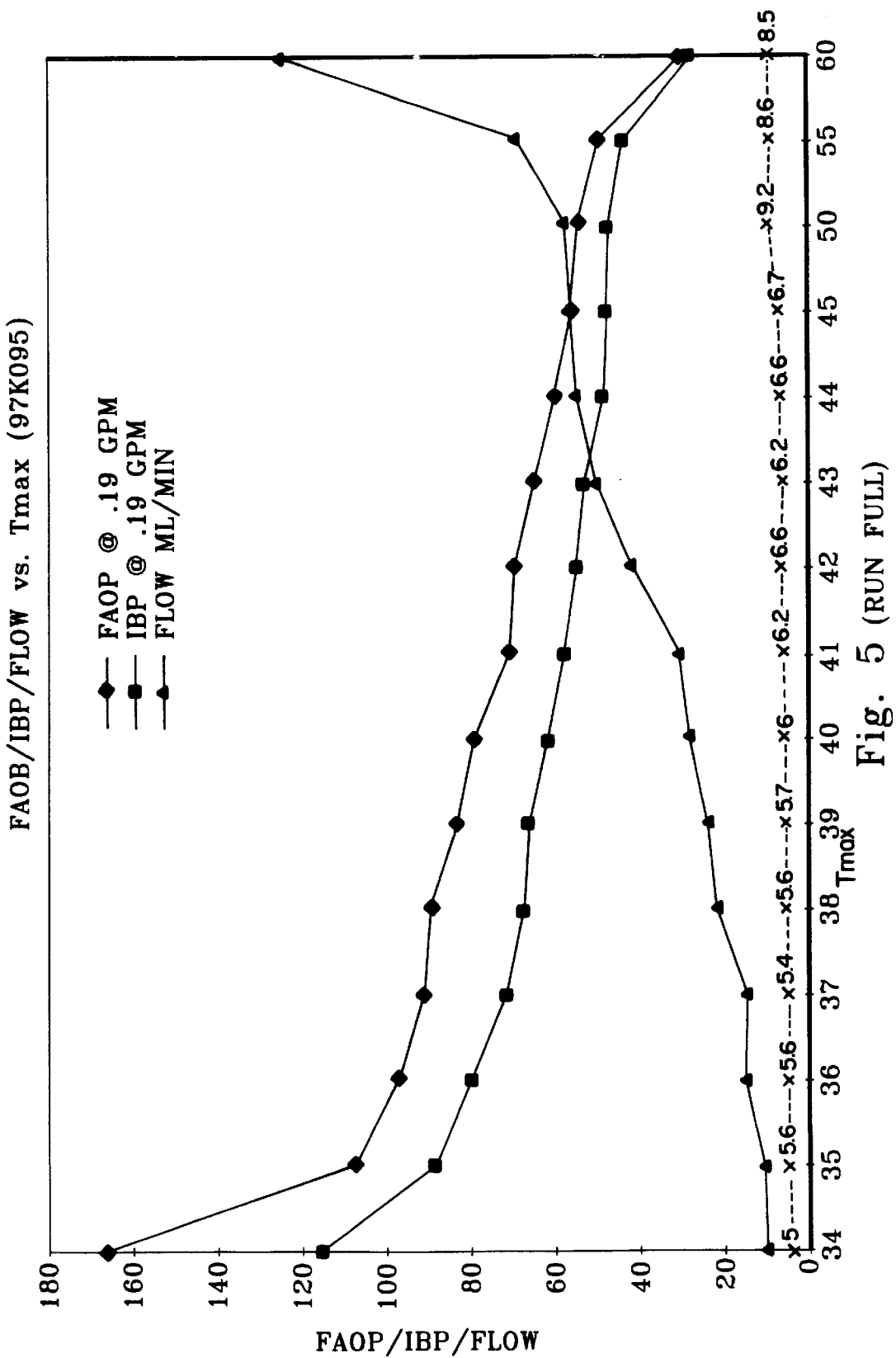
FIG. 5 is a graph illustrating the data depicted in Table 3 for Example 3.

The results of the third example are shown below in Table 3 and in FIG. 5.

TABLE 3

| Tmax | FAOP | IBP | Flow | THICK | IBP/FAOP |
|------|------|------|------|-------|----------|
| 34   | 166.0| 115.5| 11.0 | 5.0   | .696(mother dope) |
| 35   | 107.5| 88.6 | 11.4 | 5.6   | .824 |
| 36   | 97.5 | 80.2 | 15.6 | 5.3   | .822 |
| 37   | 91.3 | 71.8 | 15.4 | 5.4   | .786 |
| 38   | 90.0 | 67.5 | 22.4 | 5.6   | .750 |
| 39   | 83.3 | 66.4 | 24.3 | 5.7   | .797 |
| 40   | 79.1 | 61.6 | 28.6 | 6.0   | .779 |
| 41   | 70.8 | 57.8 | 31.0 | 6.2   | .816 |
| 42   | 69.4 | 54.7 | 42.0 | 6.6   | .788 |
| 43   | 64.6 | 52.9 | 50.4 | 6.2   | .819 |
| 44   | 59.6 | 48.3 | 54.8 | 6.6   | .810 |
| 45   | 55.5 | 47.3 | 55.9 | 6.7   | .852 |
| 50   | 54.2 | 47.0 | 57.0 | 9.2   | .867 |
| 55   | 48.9 | 43.3 | 68.5 | 8.6   | .885 |
| 60   | 29.0 | 26.6 | 126.0| 8.5   | .917 |

In Example 3, closed loop control was achieved to within ±0.15° C. Tmax critical for the dope exiting the second heating means. Prior to the conduction of the test of this example, the first heating means and the cooling means were each tuned for optimum performance (proportional, integral and derivative parameters were tuned) and held their respective target temperatures dead on which was controlled by the effects of the first heat exchanger. The first heat exchanger was controlled to a temperature differential of about 1.2° C. to about 2.2° C. and that difference plotted linear to the change in setpoint temperature from 34° C. to 60° C. Therefore, the setpoint for the first and second heat exchangers were set to the same setpoint but the setpoint in the first heat exchanger controls the process fluid and the setpoint the second heat exchanger controls the dope temperature. Thus, the approach temperature between the two heat exchangers was kept to a minimum of about 2° C. which was controlled by the effects of the first heat exchanger. Using the same setpoint for the two heat exchangers reduced the thermal energy needed for the second heat exchanger to maintain tight control over the final temperature. In other words, the first heat exchanger did most of the work by adding about 9 Kw of energy to the dope. This reduced the amount of energy needed to achieve Tmax to about 350 watts for the second heat exchanger, a much more readily controllable amount of energy. Thus, at this point, it was obvious that there was a definite relationship between pore size and the maximum temperature of the dope attained through thermal manipulation.

Example 4

A fourth Example was conducted to establish what effect flow and system pressure might have on pore size distribution. The object of Example 4 was to determine the effects/efficiency of flow on the systems ability to thermally manipulate a dope through a series of trial runs. FIGS. 1–3 were all conducted at a Flow Rate of about 700 ml/min at 1.9 GMP In example 4, the trial runs were concluded at about 1400 ml/min and at about 2100 ml/min while maintaining a system pressure of about 40 psig. In the final trail run, the system pressure was varied from about 40 psig to virtually no pressure/10 psig.

Figure 6:
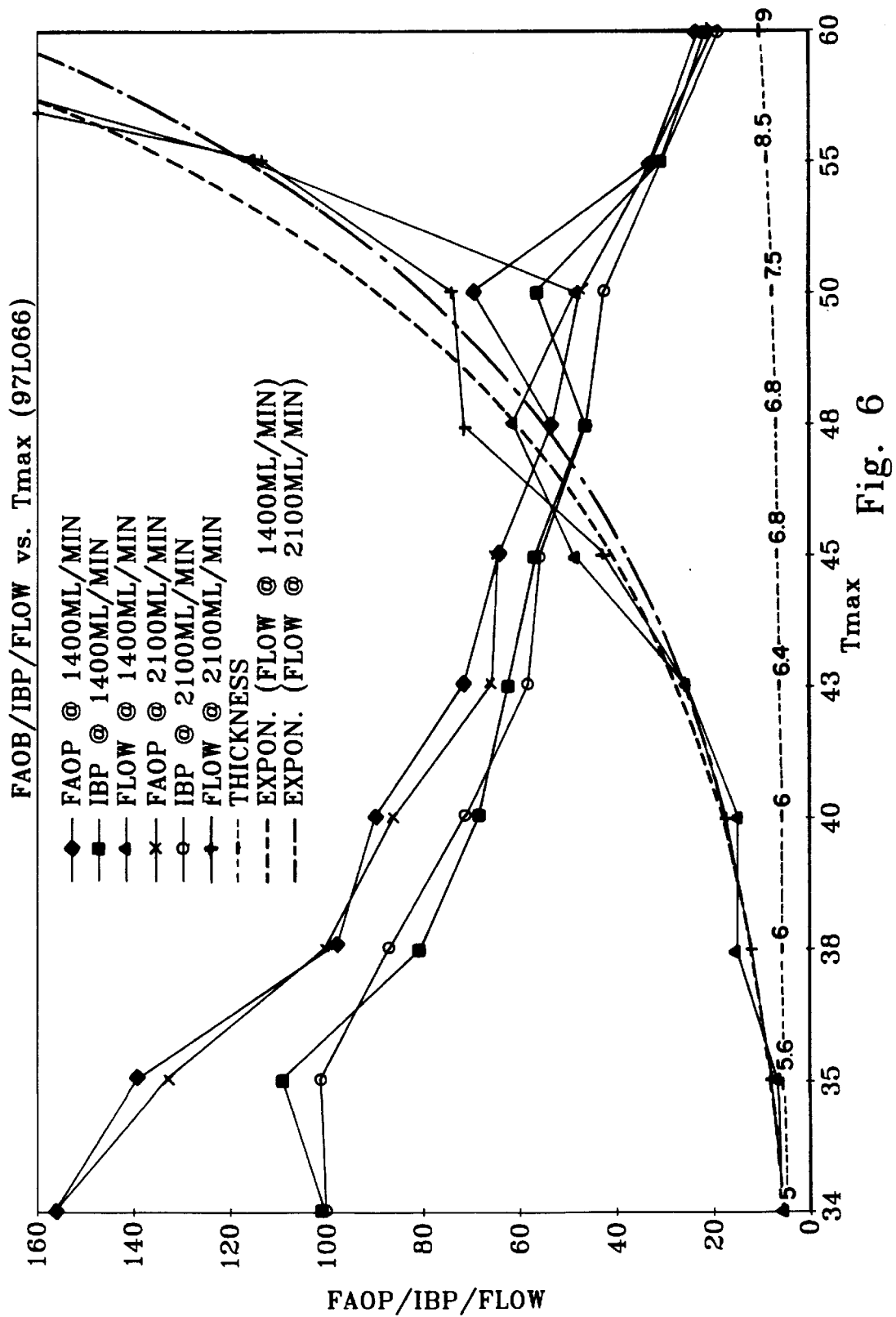
FIG. 6 is a graph illustrating the data from 34° C. to 60° C. depicted in Table 4 for Example 4.

The results of Example 4 are shown in Table 4 below and in FIG. 6.

TABLE 4

| | MOTHER DOPE | | | | | | | |
|---|---|---|---|---|---|---|---|---|
| | 1400 ML/MIN | | | | 2100 ML/MIN | | | |
| Tmax | FAOP | IBP | FLOW | THICK | FAOP | IBP | FLOW | THICK |
| 34*  | 155.4 | 100.0 | 6.2   | 5.0 | 155.4 | 100.0 | 6.3   | 5.0 |
| 35   | 138.8 | 108.7 | 6.8   | 5.4 | 132.4 | 101.0 | 7.9   | 5.6 |
| 38   | 97.7  | 80.4  | 15.3  | 5.7 | 99.4  | 86.8  | 12.8  | 6.0 |
| 40   | 89.6  | 68.6  | 15.3  | 5.9 | 86.0  | 71.0  | 17.7  | 6.0 |
| 43   | 71.4  | 62.3  | 25.4  | 6.4 | 65.8  | 58.4  | 25.7  | 6.4 |
| 45   | 64.1  | 56.7  | 48.8  | 6.7 | 64.1  | 55.6  | 42.6  | 6.8 |
| 48   | 53.0  | 46.5  | 61.0  | 6.9 | 52.9  | 45.9  | 71.4  | 6.8 |
| 50   | 69.3  | 56.5  | 48.2  | 6.8 | 47.0  | 42.2  | 73.6  | 7.5 |
| 55   | 32.2  | 30.2  | 115.8 | 8.2 | 32.0  | 30.5  | 112.6 | 8.5 |
| 60   | 22.6  | 21.1  | 213.7 | 9.3 | 20.2  | 18.6  | 240.4 | 9.7 |

*(MOTHER DOPE)

During the trial runs, it was determined that the problem with low pressure operation was trapped gases which caused the heat transfer to become less efficient. Therefore it was decided that operation pressures should be maintained at 40 psig and the system purged. As a result of the above trials, it was concluded that flow and system pressure had virtually no effect on the final material properties such as pore size distribution, as long as a positive back pressure is maintained.

Example 5

Example 5, was conducted utilizing the system of present invention. The object of Example 5 was to test a mother dope, prepared at a lower formulated temperature, utilize the new thermal manipulation system and compare the data obtained to the previous curves of the same dope formulation prepared at a higher temperature. In other words, would the new system produce a thermal response between 28° C. and 34° C. The results of Example 5 are illustrated in Table 5 below and in FIG. 7.

TABLE 5

| Tmax | FAOP | IBP | FLOW | THICK | IBP/FAOP |
|---|---|---|---|---|---|
| 28* | 182.85 | 124.3 | 5.2 | 5.2 | .679 |
| 28 | 196 | 149.3 | 4.6 | 4.9 | .761 |
| 29 | 192.5 | 138 | 4.1 | 5.2 | .717 |
| 30 | 186.9 | 132.9 | 4.8 | 5.05 | .711 |
| 31 | 184.1 | 123.6 | 5.4 | 5.3 | .671 |
| 32 | 177.1 | 119.4 | 6.4 | 5.2 | .674 |
| 33 | 177.8 | 117.6 | 4.6 | 4.9 | .661 |
| 34 | 184.5 | 122.1 | 4.8 | 5.2 | .661 |
| 35 | 152.35 | 108.1 | 5.6 | 5.5 | .709 |
| 36 | 148.1 | 99.6 | 6.8 | 5.3 | .672 |
| 37 | 136.6 | 96.9 | 7.8 | 5.6 | .709 |
| 38 | 125.7 | 96 | 9.9 | 5.8 | .763 |
| 39 | 111.05 | 80.3 | 11.9 | 5.7 | .722 |
| 40 | 110.155 | 83.3 | 13.2 | 5.6 | .756 |
| 43 | 79.35 | 61.8 | 19.9 | 6.4 | .779 |
| 45 | 70.6 | 61.5 | 27.5 | 6.8 | .871 |
| 48 | 54.8 | 48.5 | 52.8 | 7.3 | .885 |
| 50 | 47.8 | 44.3 | 69.7 | 7.6 | .928 |
| 55 | 30.4 | 28.5 | 121.4 | 8.4 | .939 |
| 60 | 22.7 | 19 | 201.7 | 9.0 | .839 |

*(as formulated)

As can be seen from the above data, this example established that it was possible to manipulated the pore size of the dope between 28° C. and 34° C. where this had previously been considered impractical. As can be seen, the membrane is noticeably tightened from 34° C. to 28° C. This indicates that pore size could be controllably varied from about 28° C. to at least about 60° C. using thermal manipulation.

The dope processed by the system and method of the present invention yielded IBP/FAOP ratios only slightly better then the conventional batch process.

Example 6

A new mother dope was prepared according to the formulation of the example for Nylon 66Z. The dope was formulated at about 28° C. and the other dope was formulated at about 34° C. Trial runs for each mother dope were conducted incrementally increasing the temperature between runs by about 2–3° C. The results are illustrated on Table 6 and FIG. 8.

Figure 8:
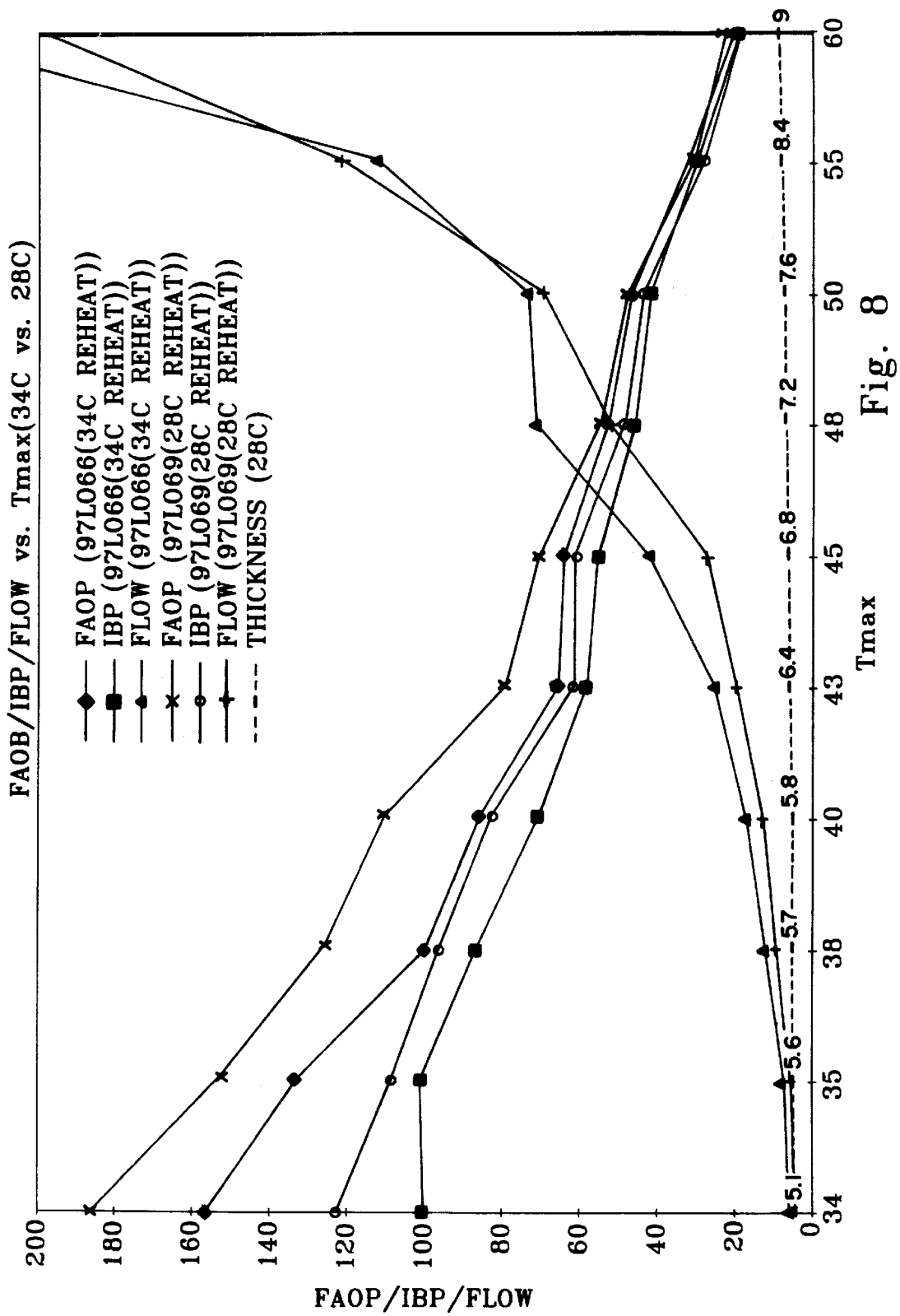
FIG. 8 is a graph illustrating the data depicted in Table 6 for Example 6.

Except for differences in the lower temperature range shown in FIG. 8, the two dopes essentially tracking each other. With better testing equipment, it might be that the results would essentially overlay each other.

These results indicated that microporous membrane produced from mother dopes having the same formulation but formulated at different temperatures provide essentially the same pore sizes in microporous membrane.

Figure 7:
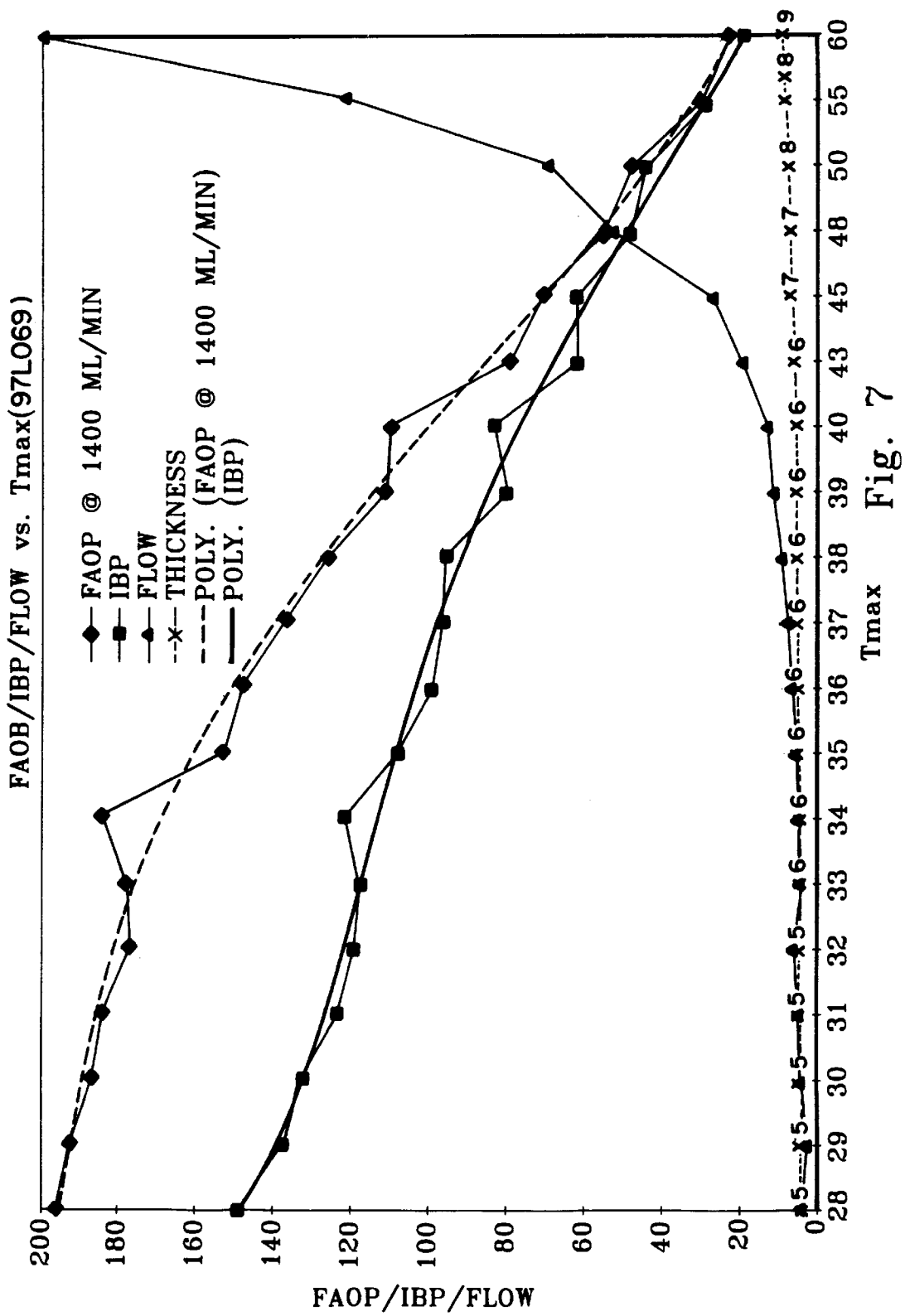
FIG. 7 is a graph illustrating the data depicted in Table 5 for Example 5.

FIG. 7 overlays the data from Example 6 for the two dopes. The system flow, pressure and dope formulation all remained constant. The only apparent difference is that the 28° C. run was processed to the final Tmax target of 34° C. using the new Dial-A-Pore ™ system unit and the 34° C. run was processed through the current converted reactor vessel method. Specifically, both dope batches were formulated identical but processed to different final temperatures during the formulation processing, FIG. 8 does not illustrate the 28° C. to 34° C. thermal response shown in FIG. 7.

TABLE 6

| 97L066 | 2100ML/M | | | | 97L069 | | | |
|---|---|---|---|---|---|---|---|---|
| Tmax | FAOP | IBP | FLOW | THICK | FAOP | IBP | FLOW | THICK |
| 34 | 155.4 | 100.0 | 6.2 | 5.0 | 184.5 | 122.1 | 4.8 | 5.1 |
| 35 | 132.4 | 101.0 | 7.9 | 5.6 | 152.4 | 108.1 | 5.6 | 5.6 |
| 38 | 99.4 | 86.8 | 12.8 | 6.0 | 125.7 | 96.0 | 9.9 | 5.7 |
| 40 | 86.0 | 71.0 | 17.7 | 6.0 | 110.2 | 83.3 | 13.2 | 5.8 |
| 43 | 65.8 | 58.4 | 25.7 | 6.4 | 79.4 | 61.8 | 19.9 | 6.4 |
| 45 | 64.1 | 55.6 | 42.6 | 6.8 | 70.6 | 61.5 | 27.4 | 6.8 |
| 48 | 52.9 | 45.9 | 71.4 | 6.8 | 54.8 | 48.5 | 52.8 | 7.2 |
| 50 | 47.0 | 42.2 | 73.6 | 7.5 | 47.8 | 44.3 | 69.6 | 7.6 |
| 55 | 32.0 | 30.5 | 112.6 | 8.5 | 30.4 | 28.5 | 121.4 | 8.4 |
| 60 | 20.2 | 18.6 | 240.4 | 9.7 | 22.6 | 19.0 | 201.6 | 9.0 |

Example 7

As is known in the art, when testing a cast membrane having a mean flow pore of 1 or greater, it is not possible to test the microporous membrane produced thereby without having some sort of support mechanism or else the produced microporous membrane would crumble of its own volition. Example 7 was conducted to establish that large pore size membrane could be made from a single mother dope utilizing the thermal manipulation principles developed in Examples 1 through 6.

The dope was formulated at 28° C. using the same formulation as the dope of Example 6. The previous examples were all run between about 28° C. and 60° C. In Example 7, the objective was to establish what the mean flow pore of a microporous membrane cast on a scrim would yield in the way of mean flow pore when tested. For this example, production equipment was utilized and the dope, heated to the various temperatures, was used to impregnate the scrim and was subsequently collected in rolls.

Figure 9:
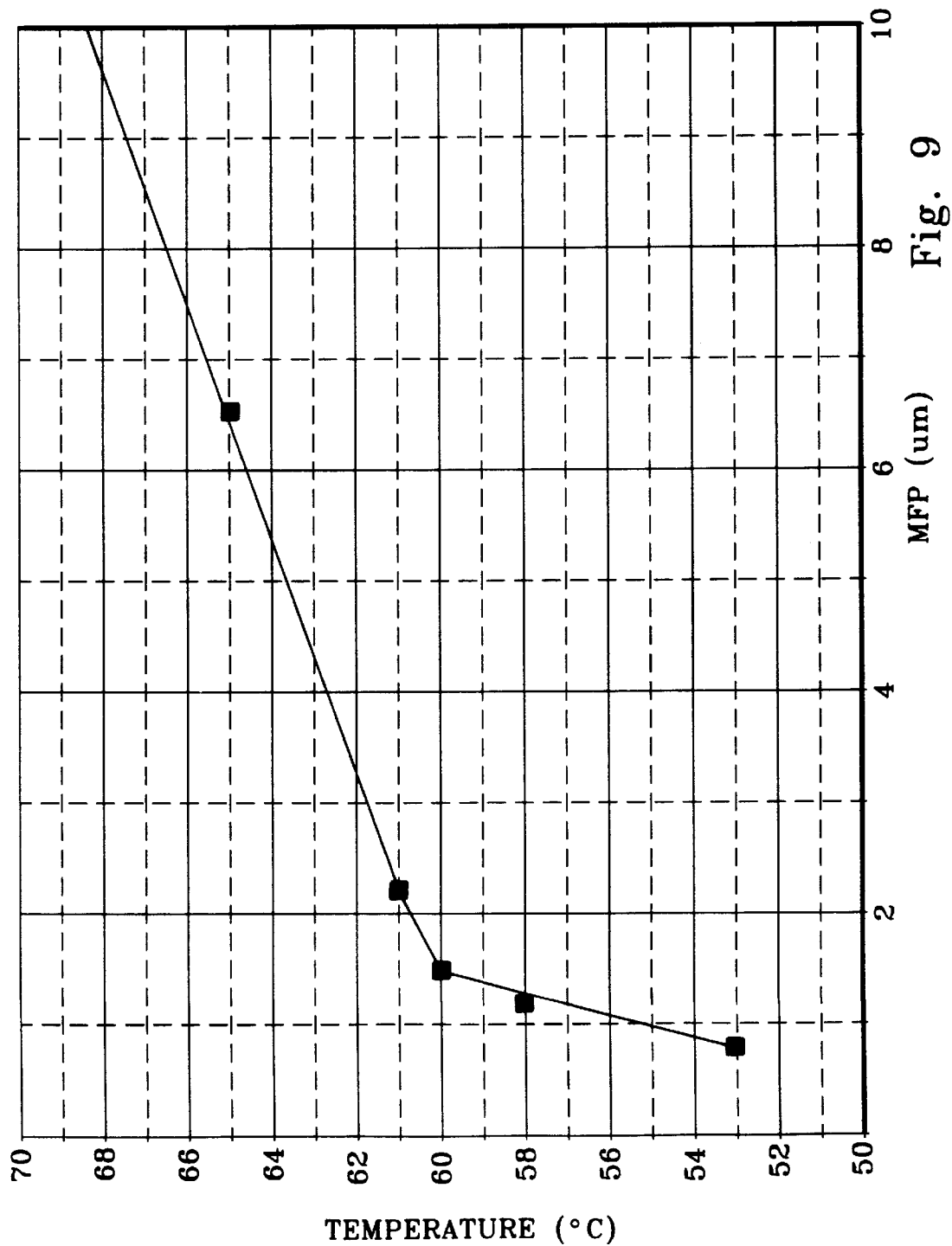
FIG. 9 is a graph illustrating the data depicted in Table 7 for Example 7.

The test results are tabulated, after tenter oven drying, in Table 7 and the mean flow pore value are shown in FIG. 9. As the mother dope was processed at a temperature between about 53° C. and about 65° C., the mean flow pore increased from about 0.8 to about 6.6. microns. This clearly indicates that it is possible to process microporous membrane from a mother dope prepared at about 28° C. and produce extremely large pore sizes in reinforced microporous membrane. The scrim used in this example was a nonwoven polypropylene (Freudenburg F02432W14) as is used in some CUNO Inc. commercial products, specifically the BevAssure II line.

resulting pore size in the final phase inversion membrane. Basically, as you increase the temperature, the pore size in the phase inversion membrane increases, but the phase inversion membrane thickness also increases, barring efforts to adjust the thickness after adjusting the temperature. Thus, one process adjustment appears to be attempting to open up or enlarge the pore size of a wet phase inversion membrane during drying but the incremental thickness increase produced by increasing the temperature appears to attempt to slightly tighten pore size after drying, especially at the smaller pore sizes. At this point, it appears that to optimize and control the pore size, water throughput (flow rate) and thickness in the final commercial phase inversion membrane product, controlling dope thickness during coating is also important. Thus, in order to get the constant thickness, predicted pore size or adjustment of pore size from the

TABLE 7

| ROLL# | Designation | Thickness (mils) | FOAP (psi) | IBP (psi) | FLOW (psi) | MKS/KL (psi) | MKS/IL (psi) | MFP (microns) |
| --- | --- | --- | --- | --- | --- | --- | --- | --- |
| 98A044-01 | BEG | 7.6 | 14.8 | 13.6 | 365.3 | 12.7 | 12.2 | 1.32 |
| " | END | 7.9 | 15.2 | 13.2 | 378.0 | 13.9 | 13.4 | 1.29 |
| 98A044-02 | BEG | 7.1 | 9.3 | 8.5 | 628.3 | 7.6 | 6.0 | 2.73 |
| " | END | 7.3 | 11.4 | 9.6 | 578.7 | 9.7 | 9.2 | 1.86 |
| 98A044-03 | BEG | 7.4 | 9.4 | 8.7 | 648.0 | 7.7 | 6.6 | 2.28 |
| " | END | 7.4 | 10.0 | 9.0 | 616.0 | 8.1 | 6.4 | 2.14 |
| 98A044-04 | BEG | 8.5 | 3.5 | 3.3 | 769.0 | 2.5 | 1.9 | 5.75 |
| " | END | 8.8 | 3.4 | 3.0 | 732.0 | 1.6 | 1.2 | 6.56 |
| 98A044-05 | BEG | 7.7 | 16.2 | 14.9 | 388.0 | 13.5 | 12.5 | 1.60 |
| " | END | 7.3 | 16.4 | 15.1 | 347.7 | 13.9 | 13.1 | 1.57 |

CONCLUSIONS

The results of the above tests were very promising in that the target temperature control of Tmax critical was accomplished to ±0.15° C. below the ±0.2° C. target. The thermal response testing generated smooth and repeatable curves. This indicated that the dope/membrane material properties resulting from the new systems and methods are precise and repeatable.

Cooling of the dope appears to be important for two reasons. First, cooling stabilizes the pore size condition in the dope in that the dope does not see a higher temperature than was imparted to the dope during the temperature elevation/manipulation phase. Second, cooling controls the viscosity that will be the final casting viscosity.

While we have not as yet conducted experiments to verify that the present invention will have the same or similar results when using other ternary phase inversion polymers, it is presently believed that the present invention can be useful in the processing of a large number of ternary phase inversion polymers into membrane or other useful purposes because of the similar chemical compositions and structures. Specifically, since nylon 66 is a member of a group of polymers that are capable of being process into micropourous membrane via the phase inversion process, the nature of this process is such that there is a strong probability that the methods and systems of the present invention will be applicable to these other polymers as well, including, but not limited to, nylon 66, nylon 46, nylon 6, polysulfone, polyethersulfone, polyvinylidenediflouride (PVDF) and other ternary phase inversion polymers that form micropourous structures through the phase inversion process.

Control of Thickness

During the conduct of the above examples, another phenomenon was observed concerning the relationship between the dope temperature, the cast membrane thickness and the temperature adjustment, it is necessary to also control the thickness of the dope at the casting station by "turning another dial" to reduce the coating weight during casting so that the finished phase inversion membrane thickness is maintained within specifications during casting in order to obtain the most optimal combination of pore size, thickness and throughput in the dried phase inversion membrane.

For example, when producing six (6) mil phase inversion membrane at 40° C., the test results indicated that the membrane pores were a little too small (or below specification). The necessary adjustment was obtained from constant thickness calibration curves which indicated that it was necessary to raise the temperature to 42° C. The temperature was adjusted to 42° C. and, at that point, the membrane pore size was increased, but the thickness of the membrane being produced may also increase. If the thickness of the dope being cast were to increase, the membrane produced will probably not have all of the pore size membrane increase predicted due to the thickness increase in the dope being cast when the membrane exits the drying process. Therefore, the final phase inversion membrane pore size, due to the thickness increase, will not be correspondingly as large as predicted, unless the dope thickness during casting is controlled to the original thickness of about six (6) mils.

Alternatively, one could develop a constant coating weight (defined as the polymer, nylon, per unit area of membrane) predicted pore size response calibration curve, and allow the resulting phase inversion membrane thickness to vary. This might be important in applications where total nylon polymer loading is more important than a specific thickness.

Thus, in addition to precisely controlling the temperature, another aspect for precisely, predictably controlling the pore thickness in microporous phase inversion membrane includes controlling either the thickness or the coating weight of the dope during casting, coating weight being defined as the weight per unit area of polymer which is added to the substrate. All other parameters being constant, an increase in coating weight will result in an approximately proportional increase in thickness. Without control of the membrane thickness, precise control of the pore size is not as precise as would be predicted from the constant thickness predicted pore size calibration for temperature manipulation alone. So therefore, for the best control of the pore size attributes in the final microporous phase inversion membrane, it is necessary not only to control the temperature but also to hold constant either the thickness or the coating weight of the phase inversion membrane that is being cast.

While thermal manipulation alone will manipulate phase inversion membrane pore size, unless the casting thickness is also controlled, the resulting final membrane is not as precise or as optimal as would be desirable. To produce phase inversion membrane having the predicted precisely controlled pore size, the temperature should be adjusted to produce the required pore size, then either the thickness or the coating weight should be adjusted to compensate for the pore size change, in such a manner to maintain either a substantially constant thickness or a substantially constant coating weight in the finished phase inversion membrane product.

While not wishing to be bound by theory, it is presently believed that the most advantageous results of the present invention are achieved by using the above discussed thermal manipulation and by correcting the coating for thickness during the casting of the dope. During dope casting, as you raise the temperature, the dope pore size decreases, which (at a constant coating weight) causes thickness to go up, so by bringing the dope thickness back down to the target thickness, the most optimal pore size, thickness and throughput in the finished membrane is produced. During membrane production, there is usually an established thickness specification with a tolerance, it is best not to deviate from the established thickness tolerance.

With the systems and methods of now possible invention, it is now possible to formulate a single master dope under conditions that prevent the mixing temperature during formulation from exceeding a specific temperature with the master dope batch having the maximum non-solvent to solvent ratio possible at that specific temperature. Once formulated, the single master dope batch can be processed or "dialed" to produce any one of a plurality of predetermined pore sizes by incremental elevation of the temperature of a small portion of a master dope batch to any one of a plurality of predetermined temperature, as long as the plurality of temperatures are equal to or greater than the maximum temperature that the dope had previously been elevated to during prior processing. This adjustment can be done in both directions, ie., from small to large pore size and from large to small pore size in any order.

The present invention uses real time temperature control in conjunction with thickness control/coating weight control, based upon the pore size actually being created on production equipment. Thus, pore size can be adjusted on a real time continuous basis as opposed to formulating a batch of dope and processing the batch according to the prior art, by connecting the batch to the production machine and producing membrane. Using the systems and methods of the present invention, the samples taken actually measure, in real time, the output of the process where the dope is converted into microporous phase inversion membrane. This measurement is done on a real time basis in adjusting dope pore size via temperature modification or thermal manipulation and control of thickness/coating weight on a continuous real time basis.

Now, therefore, with the methods and systems of the present invention any one of a plurality of phase inversion membranes having any one of a plurality of pore sizes, according to a range discussed earlier, can be produced from the same master dope batch, the master batch consisting of the tightest dope that can be made at a particular temperature. Thus, with thermal manipulation of the dope, membrane can be produced by processing dope from the same single master batch and adjusting the pore size by modifying the dope temperature while conventionally controlling membrane thickness in either direction from the midpoint or between the upper and lower limits of the possible pore sizes for a specific master dope. The tightest master dope batch is defined as a batch formulated such that no additional non-solvent can be added to the mixture without polymer precipitating uncontrollably out of solution, which would be the penultimate master batch. With this ultimate master batch, it is possible to produce as a membrane having extremely tight or small pores to membrane having the largest or loosest pores possible.

As can be seen, the systems and methods of the present invention described above for producing a plurality of different pore size from a single ternary phase inversion polymer master dope batch have eliminated the requirement for the preparation of a plurality of dope batches, each dope batch being selectively formulated to produce a specific pore size when the dope was processed into microporous membrane. Further, the systems and methods of the present invention provide production runs of a microporous membrane having a plurality of pore sizes from a single, formulated master dope batch. The systems and methods of the present invention allow a manufacturer to produce microporous membrane having any one of a plurality of different pore sizes from only a single, commonly formulated master dope batch, thereby eliminating the need to process an entire dope batch to produce dope for a single pore size. Such prior production limitations often resulted in the production of more microporous phase inversion membrane having a specific pore size than was currently required to fill customer orders. By producing more microporous membrane than was needed, membrane inventory in a particular pore size was increased, reducing manufacturing efficiency and productivity, thereby increasing cost.

With the methods and systems of the present invention, it is now possible to achieve a finer degree of control over the master dope batch such that the master batch is able to produce the widest possible range of pore sizes in membrane, considerably wider than a single batch had previously been believed capable of producing or actually produced. This wide range of pore sizes produced in membrane is achievable from the smallest possible pore size to the largest possible that the master dope batch is capable of producing, in real time and in any order with independent control of the dope viscosity at the casting apparatus.

While the systems and methods contained herein constitute preferred systems and methods of the invention, it is to be understood that the invention is not limited to these precise systems and methods, and that changes may be made therein without departing from the scope of the invention which is defined in the appended claims.

What is claimed is:

1. A system for controlling the thermal manipulation of a ternary phase inversion polymer master dope to a temperature no higher than a predetermined temperature prior to delivery of the dope to a dope processing site, the system comprising:

a vessel for containing a ternary phase inversion polymer master dope, the dope having been exposed to a mixing temperature, to establish a first dope temperature memory, which is no higher than the temperature necessary to effect dissolution and equilibrium mixing of the polymer, solvent and nonsolvent, the vessel and the dope contained therein being maintained at a temperature nominally lower than the mixing temperature, such temperature being sufficient to stabilize and maintain the mixture after cooling from the mixing temperature;

a pump, operatively connected to the vessel, for incrementally transporting portions of the dope from the vessel to a dope processing site; and heating means, operatively connected to the pump and the dope processing site, for elevating the temperature of at least a portion of the dope being incrementally transported from the vessel and through the heating means to any one of a possible plurality of different predetermined temperatures, each dope portion being incrementally transported through the heating means being elevated to a temperature within about ±0.2° C. of a selected one of the possible plurality of different predetermined temperatures to establish any one of a possible plurality of different second dope temperature memories, each predetermined temperature being selected from a calibrated characterization curve which describes the relationship between the dope being processed and the resulting pore size in the formed membrane.

2. The system of claim 1 further comprising:

cooling means, operatively positioned between the heating means and the dope processing site, for cooling the dope from the predetermined temperature to a viscosity sufficient for processing as a microporous phase inversion membrane.

3. The system of claim 1 wherein the heating means further comprises:

first heating means, operatively connected to the pump, for elevating the temperature of at least a portion of the dope being incrementally transported there through to a temperature within about 2° C. below the predetermined temperature; and second heating means, operatively connected to the first heating means, for further elevating the temperature of at least a portion of the dope being incrementally transported there through to a temperature no higher than within about ±0.2° C. of the predetermined temperature.

4. The system of claim 3 wherein the second heating means further elevates the temperature of the dope being incrementally transported there through to a temperature no higher than within about ±0.15° C. of the predetermined temperature.

5. The system of claim 1 further comprising:

means, operatively positioned at the dope processing site and operatively connected to the heating means, for controlling the thickness of the dope during dope casting.

6. The system of claim 1 further comprising:

means, operatively positioned at the dope casting site and operatively connected to the heating means, for controlling the coating weight of the dope during dope casting.

7. The system of claim 1 wherein the master dope contained in the vessel further comprises:

a phase inversion membrane polymer, a solvent and a nonsolvent in solution.

8. The system of claim 7 wherein the phase inversion membrane polymer is selected from the group consisting of:

copolymers of hexamethylene diamine and adipic acid (nylon 66), copolymers of hexmethylene diamine and sebacic acid (nylon 610), homopolymers of polycaprolactam (nylon 6) and copolymers of tetramethylenediamine and adipic acid (nylon 46).

9. The system of claim 8 wherein the phase inversion membrane polymer consists of:

copolymers of hexamethylene diamine and adipic acid (nylon 66).

10. The system of claim 8 wherein the phase inversion membrane polymer is selected from the group consisting of:

polyamide resins have a ratio of methylene ($CH_2$) to amide (NHCO) groups within the range of about 4:1 to about 8:1.

11. The system of claim 8 wherein the phase inversion membrane polymer is selected from the group consisting of:

polyamide resins have a ratio of methylene ($CH_2$) to amide (NHCO) groups within the range of about 5:1 to about 7:1.

12. The system of claim 6 wherein the phase inversion membrane polymer has a molecular weight, within the range from about 15,000 to about 42,000 (number average molecular weight).

13. The system of claim 6 wherein the phase inversion membrane polymer is polyhexamethylene adipamide, (nylon 66) having molecular weights above about 30,000 (number average molecular weight).

14. A system for continuously controlling the mixing temperature of a ternary phase inversion polymer master batch of dope formulated at a predetermined polymer to non-solvent to solvent ratio at a temperature no higher than within about ±1.0° C. of a target formulation mixing temperature, to establish a first dope temperature memory, the system comprising:

a storage vessel for maintaining the ternary phase inversion polymer master batch of dope at a controlled maximum storage temperature, the storage temperature being nominally lower than the target formulation mixing temperature;

pump means, operatively connected to the storage vessel, for sequentially transporting portions of the dope from the storage vessel to a dope processing site; and heating means, operatively positioned between the pump means and the dope processing site, for increasing the temperature of at least a small portion of the dope being transported form the vessel, as the small portion of the dope moves through the heating means, to a temperature no higher than within about ±0.2° C. of any one of a plurality of possible different predetermined temperatures to establish any one of a possible plurality of different second dope temperature memories.

15. The system of claim 14 further comprising:

cooling means, operatively positioned between the heating means and the dope processing site, for reducing the temperature of the small portion of the dope exiting the heating means to a viscosity sufficient for processing as a microporous phase inversion membrane.

16. The system of claim 14 wherein the master batch of dope is formulated at the maximum polymer to non-solvent to solvent ratio for a specific polymer loading.

17. The system of claim 14 wherein the heating means further comprises:

first heating means, operatively positioned between the pump means and the dope processing site, for increasing the temperature of the small portion of the dope, as the small portion of the dope moves though the first heating means, to a temperature about 2° C. below any one of the plurality of possible different predetermined temperatures; and second heating means, operatively positioned between the first heating means and the dope processing site, for increasing the temperature of the small portion of the dope, as the small portion of the dope moves through the second heating means, to a temperature no higher than within about ±0.2° C. of any one of the plurality of possible different predetermined temperatures.

18. The system of claim 14 wherein the second heating means increases the temperature of the small portion of the dope to a temperature no higher than within about ±0.15° C. of any one of the plurality of possible different predetermined temperatures.

19. The system of claim 14 further comprising:

means, operatively connected to the dope transporting means, for controlling the thickness of the dope during processing at the dope processing site.

20. A system for processing a single ternary phase inversion polymer master dope batch having a predetermined minimum pore size forming capability in microporous phase inversion membranes into any one of a plurality of different sized pores in microporous phase inversion membrane, the system comprising:

a vessel for containing a ternary phase inversion polymer master dope, the dope having been exposed to a mixing temperature to establish a first dope temperature memory, the vessel and the dope contained therein being maintained at a temperature nominally lower than the mixing temperature, such temperature being sufficient to stabilize and maintain the mixture after cooling from the mixing temperature;

at least one pump, operatively connected to the vessel, for transporting the dope from the vessel to a dope processing site; and means, operatively connected to the vessel, for elevating the temperature of at least a portion of the ternary phase inversion polymer master dope batch to a temperature no higher than within about ±0.2° C. of any one of a plurality of possible different predetermined temperatures to establish any one of a possible plurality of different second dope temperature memories, the any one of the second temperature memories being higher than the first temperature memory.

21. The system of claim 20 wherein the temperature of the dope is elevated to a temperature no higher than within about ±0.15° C. of any one of a plurality of possible different predetermined temperatures.

22. The system of claim 20 further comprising:

means, operatively connected to the vessel, for controllably formulating a master dope batch at a controlled maximum temperature.

23. The system of claim 20 further comprising:

means for controllably formulating a master dope batch having the maximum ternary phase inversion polymer to non-solvent to solvent ratio for the specific polymer loading.

24. The system of claim 22 wherein, during the formation of the master dope batch, the temperature is controlled to a temperature of about 21° C. to about 34° C.

25. The system of claim 24 wherein, during the formulation of the master dope batch; the temperature is controlled to about 28° C.

26. The system of claim 20 further comprising:

means, operatively connected to the temperature elevation means, for cooling the dope to a viscosity sufficient for dope processing operations, after the dope temperature has been elevated to any one of the plurality of possible different predetermined temperatures.

27. The system of claim 20 further comprising:

means, operatively connected to the temperature elevation means, for controlling the thickness of the dope during dope processing at the dope processing site.

28. The system of claim 20 further comprising:

means, operatively connected to the temperature elevation means, for controlling the coating weight of the dope during processing of the dope at the dope processing site.

29. A system for processing at least a portion of a single ternary phase inversion polymer master dope to produce a microporous phase inversion membrane having any one of a plurality of different predetermined pore sizes, the system comprising:

a formulated ternary phase inversion polymer master dope contained in a vessel, the master dope having a predetermined polymer to non-solvent to solvent ratio at a specific mixing temperature to establish a first dope temperature memory pumping means for transferring the dope from the vessel to a dope processing site; and heating means, operatively connected to the master dope, for elevating the temperature of at least a portion of the master dope batch to a temperature higher than the specific formulation mixing temperature but no higher than within about ±0.2° C. of any one of a plurality of possible different predetermined temperatures to establish any one of a possible plurality of different second dope temperature memories such that at least the portion of the dope at the elevated temperature when processed produces a microporous phase inversion membrane having pores formed therein substantially corresponding to any one of a plurality of possible different predetermined pore sizes.

30. The system of claim 29 further comprising:

means, operatively connected to the temperature elevating means, for reducing the dope temperature from the predetermined temperature to a temperature sufficient for forming microporous phase inversion membrane.

31. The system of claim 29 wherein the single master dope is formulated having the maximum polymer to non-solvent to solvent ratio at a specific temperature for a specific polymer loading.

32. The system of claim 29 wherein the dope temperature is elevated to a temperature no higher than within about ±0.15° C. of any one of the plurality of possible different predetermined temperatures.

33. The system of claim 29 wherein the temperature elevation means further comprises:

first means, operatively connected to the master dope, for elevating the temperature of at least a portion of the master dope to a temperature no higher than within about 2° C. below any one of the plurality of possible different predetermined temperatures; and second means, operatively connected to the first temperature elevating means, for further elevating the temperature of at least the portion of the master dope already elevated to no higher than within about 2° C. below the any one of a plurality of possible different predetermined temperatures to a temperature no higher than within about ±0.2° C. of the any one of a plurality of possible different predetermined temperatures to establish any one of a possible plurality of different second dope temperature memories.

34. The system of claim 33 wherein the further temperature elevating means elevates the temperature of a portion of the master dope batch to a temperature no higher than within about ±0.15° C. of the any one of a plurality of possible different predetermined temperatures.

35. The system of claim 29 further comprising:
means, operatively connected to the temperature elevating means, for controlling the thickness of the dope during dope processing at the dope processing site.

36. The system of claim 29 further comprising:
means, operatively connected to the temperature elevating means, for controlling the coating weight of the dope during dope processing at the dope processing site.

37. The system of claim 29 wherein the dope formulating means further comprises:
means for mixing a polymer, a solvent and nonsolvent while controlling the mixing temperature.

38. The system of claim 29 wherein the master dope further comprises:
a phase inversion membrane polymer, a solvent and a nonsolvent in solution.

39. The system of claim 38 wherein, the phase inversion membrane polymer is selected from the group consisting of:
copolymers of hexamethylene diamine and adipic acid (nylon 66), copolymers of hexmethylene diamine and sebacic acid (nylon 610), homopolymers of polycaprolactam (nylon 6) and copolymers of tetramethylenediamine and adipic acid (nylon 46).

40. The system of claim 38 wherein the phase inversion membrane polymer consists of:
copolymers of hexamethylene diamine and adipic acid (nylon 66).

41. The system of claim 38 wherein the phase inversion membrane polymer is selected from the group consisting of:
polyamide resins have a ratio of methylene ($CH_2$) to amide (NHCO) groups within the range of about 4:1 to about 8:1.

42. The system of claim 38 wherein the phase inversion membrane polymer is selected from the group consisting of:
polyamide resins have a ratio of methylene ($CH_2$) to amide (NHCO) groups within the range of about 5:1 to about 7:1.

43. The system of claim 38 wherein the phase inversion membrane polymer has a molecular weight within the range from about 15,000 to about 42,000 (number average molecular weight).

44. The system of claim 38 wherein the phase inversion membrane polymer is polyhexamethylene adipamide, (nylon 66) having molecular weights above about 30,000 (number average molecular weight).

* * * * *